United States Patent
Setlur et al.

(10) Patent No.: US 12,554,769 B2
(45) Date of Patent: Feb. 17, 2026

(54) SYSTEMS AND METHODS FOR SUPPORTING SKETCH-BASED QUERYING FOR DATA TREND ANALYSIS

(71) Applicant: Salesforce, Inc., San Francisco, CA (US)

(72) Inventors: Vidya Raghavan Setlur, Portola Valley, CA (US); Dennis Nathan Bromley, Seattle, WA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/789,009

(22) Filed: Jul. 30, 2024

(65) Prior Publication Data

US 2025/0117423 A1   Apr. 10, 2025

Related U.S. Application Data

(63) Continuation-in-part of application No. 18/426,186, filed on Jan. 29, 2024, now Pat. No. 12,216,678.

(60) Provisional application No. 63/640,854, filed on Apr. 30, 2024, provisional application No. 63/543,070, filed on Oct. 7, 2023, provisional application No. 63/463,055, filed on Apr. 30, 2023.

(51) Int. Cl.
*G06F 16/00* (2019.01)
*G06F 16/532* (2019.01)
*G06F 16/538* (2019.01)

(52) U.S. Cl.
CPC .......... *G06F 16/532* (2019.01); *G06F 16/538* (2019.01)

(58) Field of Classification Search
CPC .............................. G06F 16/532; G06F 16/538
USPC ......................................................... 707/722
See application file for complete search history.

(56) References Cited

U.S. PATENT DOCUMENTS

| 8,930,247 B1 | 1/2015 | Zhang |
| 9,507,805 B1 * | 11/2016 | Chechik ................ G06F 16/532 |
| 10,867,256 B2 | 12/2020 | Bugay et al. |

(Continued)

FOREIGN PATENT DOCUMENTS

KR   102191596 B1   5/2019

OTHER PUBLICATIONS

"ShapeSearch: Flexible Pattern-Based Querying of Trend Line Visualizations"; by: Tarique Siddiqui, Published 2018 https://par.nsf.gov/servlets/purl/10075379 (Year: 2018).*

(Continued)

*Primary Examiner* — Chelcie L Daye
(74) *Attorney, Agent, or Firm* — Morgan, Lewis & Bockius LLP

(57) ABSTRACT

A computing device receives, via a user interface, a drawing input directed to a dataset of time series data. The computing device converts the drawing input into a set of search terms and executes a query against a search index for the dataset using the set of search terms to retrieve a plurality of labeled trend events. Each of the labeled trend events corresponds to a respective portion of a respective line chart of a set of line charts representing the time series data and has a respective chart identifier. The computing device generates a first subset of line charts according to the retrieved plurality of labeled trend events. The computing device displays, on the user interface, one or more line charts of the first subset of line charts.

20 Claims, 31 Drawing Sheets
(19 of 31 Drawing Sheet(s) Filed in Color)

(56) References Cited

U.S. PATENT DOCUMENTS

| | | |
|---|---|---|
| 11,604,800 B1 | 3/2023 | Alubelli et al. |
| 2009/0204605 A1 | 8/2009 | Bai |
| 2013/0038612 A1 | 2/2013 | Hanumara |
| 2019/0197404 A1 | 6/2019 | Wang |
| 2019/0205305 A1 | 7/2019 | Hopcroft |
| 2021/0081818 A1 | 3/2021 | Fahmy |
| 2022/0189140 A1 | 6/2022 | Woodbeck |
| 2022/0318261 A1 | 10/2022 | Setlur et al. |
| 2023/0386672 A1 | 11/2023 | Zanos |

OTHER PUBLICATIONS

"ShapeSearch: Flexible Pattern-Based Querying of Trend Line Visualizations"; by: Tarique Siddiqui (Year: 2018) https://par.nsf.gov/servlets/purl/10075379.*

Bendeck, Notice of Allowance, U.S. Appl. No. 18/426,186, filed Sep. 30, 2024, 9 pgs.

Bendeck, Office Action, U.S. Appl. No. 18/426,192, filed May 9, 2025, 29 pgs.

Espacenet English Language Translation of Hong-Joon (Year: 2019).

Salesforce, Inc., International Search Rpt and Written Opinion, PCT/US2024/027076, Jul. 31, 2024, 13 pgs.

* cited by examiner

| Labeled trend event 1 252-1 |
|---|
| Chart ID 262-1 |
| Start point 264-1 |
| End point 266-1 |
| Label(s) 268-1 |
| ⋮ |

Figure 2B

Algorithm 1 Algorithm for converting sketch to labels

1: *sketch* ← input via sketch interface
2: *epsilon* ← 30
3: *lineSegments* ← PeuckerLinearization(*sketch, epsilon*)
4: *angles* ← ComputeAngles(*lineSegments*)
5: *shapes* ← ComputeShapes(*lineSegments, angles*)
6: *angleKDEs* ← LoadAngleKDEData()
7: *shapeKDEs* ← LoadShapeKDEData()
8: *angleLabels* ← []
9: *shapeLabels* ← []
10: for each *angle* in *angles* do
11:     *bestLabel* ← GetHighestDensityLabel(*angle, angleKDEs*)
12:     *angleLabels* ← Append([*angle, bestLabel*])
13: end for
14: for each *shape* in *shapes* do
15:     *bestLabel* ← GetHighestDensityLabel(*shape, shapeKDEs*)
16:     *shapeLabels* ← Append([*shape, bestLabel*])
17: end for
18: *finalLabels* ← SortByMidpoint(*angleLabels, shapeLabels*)
19: return *finalLabels*

Figure 4

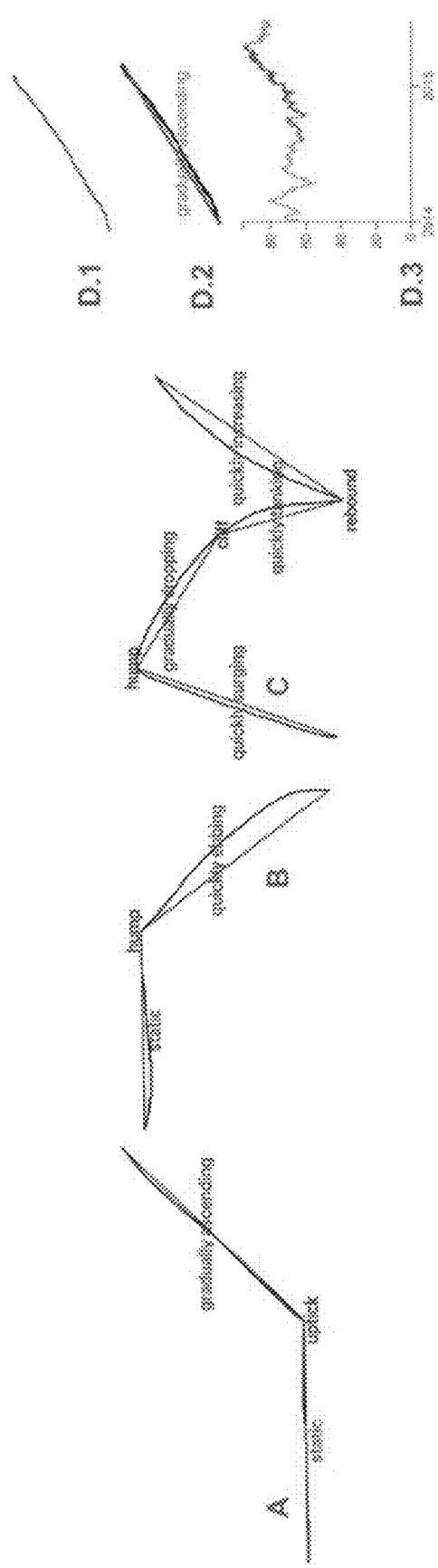

Figure 5

Examples of labeling hand-drawn trends with quantitative semantic (QS) labels. The original drawing is shown in black. QS angle labels are in green and QS shape labels are in purple. Shape and angle lines overlap, so only the purple shape line is seen. (D) Example of (1) hand-sketched line, (2) linearized and labeled line segment, and (3) recovered data trend (blue). Note that D.1-D.3 all have aligning slopes.

```
{   "index": {"similarity": {"default": {"type": "scripted",
"script": {"source": "double tf = Math.sqrt(doc.freq); double idf =
1.0; double norm = 1/Math.sqrt(doc.length); return query.boost * tf
* idf * norm;"}}}},
    "analysis": {
        "filter": {
            "synonym": {
                "type": "synonym",
                "synonyms_path": "synonyms_final.txt"
            },
            "custom_edgegrams": {
                "type": "edge_ngram",
                "min_gram": 3,
                "max_gram": 6
            }
        },
        "analyzer": {
            "modified_standard": {
                "tokenizer": "standard",
                "filter": ["lowercase", "kstem"]
            },
            "modified_standard_synonym": {
                "tokenizer": "standard",
                "filter": ["lowercase", "synonym", "kstem"]
            },
            "synonym_edgegrams": {
                "tokenizer": "standard",
                "filter": ["lowercase", "synonym", "kstem",
"custom_edgegrams"]
            },
            "edgegrams": {
                "tokenizer": "standard",
                "filter": ["lowercase", "kstem",
"custom_edgegrams"]
            }
        }
    }
}
```

Figure 6

```
{ "properties": {
    "label": {
        "type": "text",
        "analyzer": "modified_standard",
        "norms": true,
        "fielddata": false,
        "fields": {
            "edge": {"type": "text", "analyzer": "edgegrams", "search_analyzer": "modified_standard"},
            "synonym": {"type": "text", "analyzer": "modified_standard_synonym", "search_analyzer": "modified_standard"},
            "synonym_edge": {"type": "text", "analyzer": "synonym_edgegrams", "search_analyzer": "modified_standard"}
        }
    },
    "nouns_verbs": {
        "type": "text",
        "analyzer": "modified_standard",
        "norms": true,
        "fielddata": false,
        "fields": {
            "edge": {"type": "text", "analyzer": "edgegrams", "search_analyzer": "modified_standard"},
            "synonym": {"type": "text", "analyzer": "modified_standard_synonym", "search_analyzer": "modified_standard"},
            "synonym_edge": {"type": "text", "analyzer": "synonym_edgegrams", "search_analyzer": "modified_standard"}
        }
    }
}
}
```

Figure 7

```
subsiding => lessening, lessen, relaxing, easing, abating
ascending => uprising
decline => diminution, declivity, declension, decay, declination,
reduction, downslope
soft => slack, gentle, slight, meager, mild, weak, easy
escalating => amplifying, intensify, step up, intensifying
bouncing => jounce, rallying, resurging, recovering
descending => down, sliding, come down
mounting => wax, accumulating, climb up
decreasing => minify, lessen, dwindling, reducing, lowering
stable => solid, fixed, firm, secure
accelerating => quickening, speeding, rushing, hastening, speed,
speed up, quicken
diminishing => lessening, lessen, dwindling, reducing
consistent => regular, uniform
falling => down, lessen, plummeting, come down, lowering
sharp => abrupt, intense, steep, precipitous, acute, severe,
dramatic
sharply => steeply
upturn => improvement, recovery
constant => fixed, invariant, changeless
declining => sliding, reducing, worsen
steady => firm, uniform, unfluctuating
```

Figure 8A

```
even => equal, uniform
stagnant => dormant, inactive, unmoving, moribund, lethargic
slumping => slide down, drooping, diving
decelerating => cooling, moderating, retard, easing-off, reducing
growing => amplifying, enlarging
soaring => soar up, rallying, soar upwards, skyrocketing, zoom
downturn => downswing, recession
maximum => peak, peaked, top, climax, pinnacle, high, extremum,
crest, crown, apex, zenith, acme, vertex, summit, highest, max
quick => swift, prompt, rapid, hasty, speedy
quickly => fast
dropping => plummeting, drop down
increasing => amplifying, intensifying
climbing => wax, climb up
rising => wax, progressing, arise, enhancing, come up, uprise, move
up, appreciating, lift
peak, peaked
least, minimum, min, lowest
least, minimum, min, lowest
dipping, dip
static => flatlining, stagnating, stagnant, plateauing, plateau,
unchanging, unvarying, constant, stable, steady, even, flat
```

1502 Receive, via a user interface, a drawing input directed to a dataset of time series data

1504 The display comprises a touch-sensitive display. Receive a user-drawn input via the touch-sensitive display

1506 Receive user upload of a sketch image onto the computing device

1508 Receive user selection of a first sketch from a library of sketches

1510 Receive user specification of a time span corresponding to the drawing input

1512 Convert the drawing input into a set of search terms

1514 Identify a slope and shape of at least a segment of the drawing input

1516 Determine one or more line segments from the drawing input. Assign a respective search term to each of the line segments

1518 After determining the one or more line segments, determine angles and rotations over the one or more line segments. Compare the angles and rotations with distributions of predetermined slope and shape labels, where each of the predetermined slope and shape labels corresponds to a respective search term. Assign the respective search term to each of the line segments according to the comparing

1520 Determine, for each of the line segments, a respective set of values for a set of attributes of the respective line segment

1522 Apply an algorithm to linearize the drawing input into one or more line segments

1524 Applying the algorithm includes modifying a value of a parameter of the algorithm according to a user of the drawing input

Figure 15A 1500 (Cont'd)

1526 After converting the drawing input into the set of search terms, automatically populate the set of search terms in an input box of the user interface. Each of the search terms corresponds to respective descriptive text that describes a respective trend of a portion of the drawing input 1528 After converting the drawing input into the set of search terms, input the set of search terms into a real-time data stream 1530 Execute a query against a search index for the dataset using the set of search terms to retrieve a plurality of labeled trend events. Each of the labeled trend events (i) corresponds to respective portion of a respective line chart of a set of line charts representing the time series data and (ii) has a respective chart identifier 1532 Identify data in the dataset corresponding to the slope and shape of at least a segment of the drawing input 1534 Generate a first subset of line charts according to the retrieved plurality of labeled trend events 1536 Assign each of the labeled trend events to a respective group, of one or more groups, according to the chart identifier of the labeled trend event. Each group corresponds to one respective line chart in the set of line charts 1538 Rank the one or more groups by aggregating, for each group, respective composite scores of the respective labeled trend events corresponding to the group 1540 Retrieve, from the dataset, data corresponding to a first subset of line charts in accordance wit the ranking of the one or more groups 1542 Determine, for a respective labeled trend event, a respective composite score according to a ranking algorithm and a respective visual saliency score

Figure 15B

SYSTEMS AND METHODS FOR SUPPORTING SKETCH-BASED QUERYING FOR DATA TREND ANALYSIS

RELATED APPLICATIONS

This application is a continuation-in-part of U.S. patent Application Ser. No. 18/426,186, filed Jan. 29, 2024, titled "Search Tool for Exploring Quantifiable Trends in Line Charts," which claims priority to (a) U.S. Provisional Patent Application No. 63/543,070, filed Oct. 7, 2023, titled "Search Tool for Exploring Quantifiable Trends in Line Charts" and (b) U.S. Provisional Patent Application No. 63/463,055, filed Apr. 30, 2023, titled "Quantifying the Semantic Meaning of Hedge Words used for Data Interaction," This application also claims priority to (i) U.S. Provisional Patent Application No. 63/640,854, filed Apr. 30, 2024, titled "SKETCH-A-SLOPE: Supporting Sketch-Based Querying for Data Trend Analysis" and (ii) U.S. Provisional Patent Application No. 63/543,070, filed Oct. 7, 2023, titled "Search Tool for Exploring Quantifiable Trends in Line Charts." All of the aforementioned applications are incorporated by reference herein in their entireties.

This application is related to the following applications, all of which are incorporated by reference herein in their entireties:

(i) U.S. patent application Ser. No. 18/426,186, filed Jan. 29, 2024, titled "Search Tool for Exploring Quantifiable Trends in Line Charts"; and (ii) U.S. patent application Ser. No. 18/426,192, filed Jan. 29, 2024, titled "Systems and Methods for Exploring Quantifiable Trends in Line Charts."

TECHNICAL FIELD

The disclosed implementations relate generally to data visualization and more specifically to systems, methods, and user interfaces that enable users to explore quantifiable trends in time series data.

BACKGROUND

Natural language and search interfaces facilitate data exploration and provide visualization responses to analytical queries based on underlying datasets. Existing search tools support basic analytical intents to just document search, fact-finding, or simple retrieval of data values, and have limited support for more specific analytic tasks such as the identification of precise temporal trends in time-series data.

SUMMARY

Trend analysis is an important aspect of the data analysis and decision-making process. Trends are data patterns that indicate a general change in data attributes (e.g., data fields, or data values of a data field) over time. The identification of data trends can in turn lead to the recognition of anomalies or deviations from normal or expected values of a dataset, due to factors such as significant events, seasonality, and market conditions. Visual data analysis tools often visualize trends as line charts. These tools can also provide additional computation functionality such as moving averages, trend lines, or regression analysis to indicate how the data changes over time.

Search interfaces, including those that enable natural language inputs, can facilitate data exploration and provide visualization responses to analytical queries based on underlying datasets. For instance, search engines can provide data relevant to the user's query in the form of visualizations and/or widgets. Natural language interfaces (NLIs) for visual data analysis and large language models (LLMs) make it easy and convenient for a user to interact with a device and query data through the translation of user intent into device commands.

Presently, many search tools can only support basic analytical tasks such as document search, fact-finding, or simple retrieval of data values. These tools have limited support for more specific analytic tasks, such as computing derived values, finding correlations between variables, creating clusters of data points, and identifying temporal trends. NLI-related tools that are currently available tend to focus on the general support of analytical inquiry and does not consider the interpretation of intents specific to data trends.

Furthermore, traditional search systems rely on accurately understanding user queries to deliver relevant and precise search results. However, the precision and recall of these search systems often depend on mapping the mental model of the search intent with the metadata and keywords that represent content, a process that can be complex due to the subjective nature of how users conceptualize and describe their search goals. This challenge is particularly prevalent for content such as images and sound, where the traditional text-based or user interface-controlled input often lacks the flexibility to capture the full spectrum of user intent. For instance, in image search, users may know the visual style or composition they seek but find it difficult to encapsulate this in keywords. Similarly, for music content retrieval, users might search for a specific auditory quality or mood that does not neatly translate into existing categorical tags or descriptors.

The human language (e.g., natural language) is remarkably diverse when it comes to describing data trends. Expressions such as "slow increase," "steady increase," "exploding," "slumping," and "tanking" convey different extents (e.g., relative magnitudes or degrees) of changes in data values and are likely to invoke different user responses. The expressive power in these scenarios comes from the precise, quantified semantics of these words used to describe the trends, which existing NLI systems are unable to capture or leverage upon.

To empower users to search and glean patterns in data trends, what is needed are improved systems, devices, and user interfaces that are capable of leveraging semantics to interpret expressive user analytical intents. Using the stock market as an example, the system would need to understand what terms such as "plateau," "tank," or "fell sharply" mean to a user, in order to be able to identify the relevant stocks that fit the description and provide that information to the user.

Some embodiments of the present disclosure are directed to a system that enables users to search for phenomena in a dataset by leveraging precise, quantified semantics of language, focusing on searching for trends in data.

As disclosed, in some embodiments, the system includes an NLI for receiving a natural language input, which can specify search terms directed to a dataset. The disclosed system detects analytical trend intents in the search queries, and finds trends matching the specified quantifiable properties such as "sharp decline" and "gradual rise" in line charts. By leveraging quantified semantics of language, the disclosed uniquely explores the nuances of trend patterns and their properties using natural language as the modality for expressing trend search queries.

As disclosed, in some embodiments, a system leverages a quantified semantics dataset and labeling algorithms to produce a novel analytical search experience that supports diverse trend search intents and facilitates the retrieval and visualization of temporal data patterns. In some embodiments, the system incorporates custom logic for scoring and ranking results based on both the label relevance and visual prominence of trends. In some embodiments, the system surfaces a semantic hierarchy of trend descriptor terms from a dataset, with which the user can interact to filter results down to only those that it deems most relevant.

As disclosed, in some embodiments, the system interprets analytical intents expressed through sketches. By recognizing and processing the shapes and patterns drawn by users, the disclosed system aligns with the evolving capabilities of search systems, exploring how visual inputs can be used to query and interact with data, such as in the context of identifying trends expressed as line charts.

As disclosed, in some embodiments, the system includes a drawing interface that enables users to directly draw trends they are interested in. The drawing interface provides an alternative input modality (e.g., additional to the natural language input modality) that captures a user's idea effectively in instances where a user's search intent may be abstract and difficult to capture through conventional textual input. In some embodiments, the system interprets the drawing inputs by labeling a sketched input using a predefined vocabulary of quantitative trend descriptors. These descriptors categorize sketches based on attributes such as slope direction, curvature, and magnitude, and enable faceted search behavior, where users can filter results according to various trend characteristics. In some embodiments, the system translates the variable strokes of the sketch into a set of text query terms that incorporates both the geometric features of the sketch and the temporal context in which the data exists. These terms are then used to search for trends containing patterns encapsulated in the sketch.

As disclosed, the implementation of a system with a drawing interface that enables users to provide drawings inputs advantageously improves over existing search system, especially in situations where users may encounter limitations in the expressivity of specifying text-based search queries. For example, when users are restricted to certain predefined search terms and phrases, these terms may not fully encapsulate the users' analytical intent or the subtle nuances that they perceive within the data. For instance, differentiating between a "sharp rise" and a "gradual increase" using only text can be imprecise without additional context or knowledge of the use of quantitative modifiers. In addition, users may seek patterns within a dataset that are intuitive visually but challenging to describe succinctly using conventional text query language.

As disclosed, in some embodiments, the system also integrates text with the search results, along with faceted browsing, to provide additional information and expressivity for navigating the search results. The present disclosure builds upon search and NLI data analysis systems to support the exploration of trends with a comprehensive labeled semantic concept map of trends and their properties.

The systems, methods, and user interfaces of this disclosure each have several innovative aspects, no single one of which is solely responsible for the desirable attributes disclosed herein.

In accordance with some embodiments, a method for analyzing data trends is performed at a computing device that includes a display, one or more processors, and memory. The method includes receiving, via a user interface, a drawing input directed to a dataset of time series data. The method includes converting the drawing input into a set of search terms. The method includes executing a query against a search index for the dataset using the set of search terms to retrieve a plurality of labeled trend events. Each of the labeled trend events (i) corresponds to a respective portion of a respective line chart of a set of line charts representing the time series data and (ii) has a respective chart identifier. The method includes generating a first subset of line charts according to the retrieved plurality of labeled trend events. The method includes displaying, on the user interface, one or more line charts of the first subset of line charts.

In some embodiments, converting the drawing input into a set of search terms includes identifying a slope and shape of at least a segment of the drawing input. Executing the query against the search index for the dataset using the set of search terms to retrieve the plurality of labeled trend events includes identifying data in the dataset corresponding to the slope and shape.

In accordance with some embodiments, a computing device includes a display, one or more processors, and memory coupled to the one or more processors. The memory stores one or more programs configured for execution by the one or more processors. The one or more programs include instructions for performing any of the methods disclosed herein.

In accordance with some embodiments, a non-transitory computer readable storage medium stores one or more programs configured for execution by a computing device having a display, one or more processors, and memory. The one or more programs include instructions for performing any of the methods disclosed herein.

Thus methods, systems, and graphical user interfaces are disclosed that support querying of quantifiable trends via sketch inputs and natural language inputs.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a better understanding of the aforementioned systems, methods, and graphical user interfaces, as well as additional systems, methods, and graphical user interfaces that provide data visualization analytics, reference should be made to the Detailed Description of Implementations below, in conjunction with the following drawings in which like reference numerals refer to corresponding parts throughout the figures.

FIG. 2B illustrates a labeled trend event, in accordance with some embodiments.

FIG. 4 illustrates an algorithm for converting sketch to labels, in accordance with some embodiments.

FIG. 5 illustrates examples of labeling hand-drawn trends with quantitative semantic (QS) labels, in accordance with some embodiments.

FIG. 6 shows a code snippet for a search index configuration, in accordance with some embodiments.

FIG. 7 illustrates a code snippet for defining the properties of fields within an index mapping in the search index, in accordance with some embodiments.

FIGS. 8A and 8B illustrate contents of a synonym file, in accordance with some embodiments.

FIGS. 15A to 15C provide a flowchart of a method for analyzing data trends, in accordance with some embodiments.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DETAILED DESCRIPTION OF IMPLEMENTATIONS

Some embodiments of the present disclosure are directed to systems, methods, and user interfaces that enable users to search and glean for patterns in trends. The present disclosure extends the capabilities of general search to supporting intents that involve trends and their properties in line charts.

User Interface

Figure 1A:
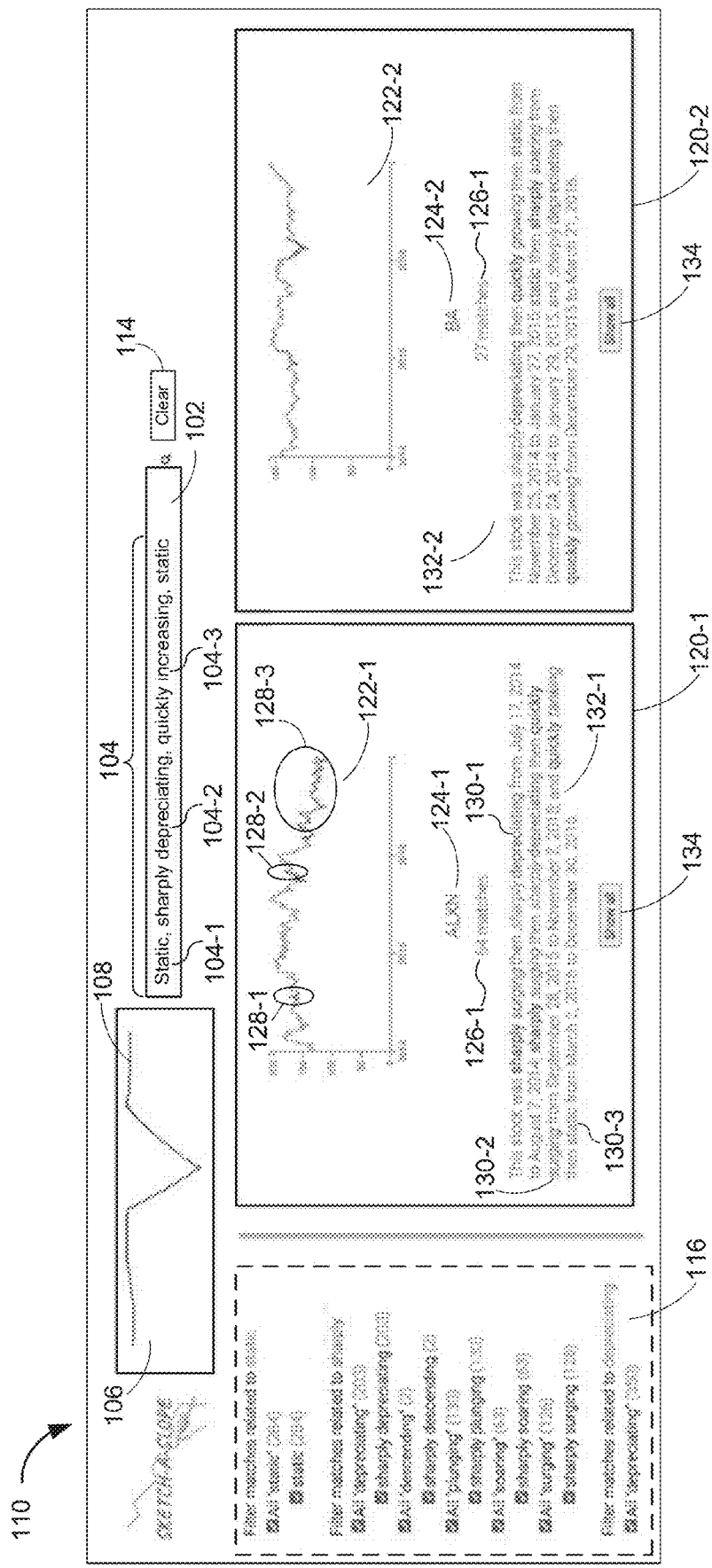
FIG. 1A illustrates a user interface for a system that supports querying of trends, in accordance with some embodiments.

FIG. 1A illustrates an example user interface 110 for a system that supports data trend analysis, in accordance with some embodiments. The user interface 110 is designed to explore data trends through a blend of natural-language based, sketch-based, and semantic descriptors input.

In some embodiments, the user interface 110 includes a natural language input box 102 (also referred to herein as a search bar) that enables a user to input natural language queries to search for a trend of interest.

In some embodiments, the user interface 110 includes a drawing input box 106 (e.g., a drawing canvas or a scalable vector graphics (SVG) canvas) that allows for querying by drawing. For example, FIG. 1A illustrates a drawing input 108 that is received by the user interface 110. In this example, the drawing input 108 comprises a user sketching a desired data trend directly on the user interface 110. A sketch interpreter 235 (or sketch interpretation module 335) processes the sketch to populate the natural language input box 102 with corresponding textual trend descriptors. In FIG. 1A, the natural language input box 102 is automatically populated with text-based semantic trend descriptors 104 (e.g., search terms) from the input sketch, displaying terms "static," "sharply depreciating," and "quickly increasing." The user interface 110 includes a user-selectable affordance 114 (e.g., "Clear") that, when selected, removes the descriptors 104 and/or drawing input 108 from the user interface 110.

To facilitate precise data retrieval, in some embodiments, the user interface 110 affords a faceted filtering mechanism. For example, FIG. 1A shows that the user interface 110 includes a panel 116 for displaying faceted filter options, where users can refine search results based on the trend. A user can optionally filter the results to include only specific matches that are of interest. The text box filter in the panel 116 is nested hierarchically by individual semantic concepts. For instance, "All depreciating" is a parent of "sharply depreciating." Results appear as tiles 120 (e.g., tile 120-1 and tile 120-2) below the natural language input box 102 and the drawing input box 106. In the example of FIG. 1A, the search terms are queried against a dataset of stock prices over time. Each tile 120 corresponds to one stock and shows a line chart 122 of the stock price over time (e.g., line chart 122-1 for the stock ALXN and line chart 122-2 for the stock BA, the stock ticker 124 (e.g., stock ticker 124-1 and 124-2), the number of matches 126 (e.g., 126-1 and 126-2) for that input query for that stock, and a text description 132 (e.g., text snippet) describing highest matches (e.g., up to three or five highest matches) for that stock.

Although the present disclosure describes examples that focus on supporting the interpretation of queries to search for trends within an exemplary dataset that includes labeled trend events for stock data, it will be apparent to one of ordinary skill in the art that the processes to create labeled events as disclosed herein are equally applicable to time-series data, or trend data, in other domains.

In some embodiments, the time periods corresponding to those highest scoring matches are emphasized in a different color on the line chart. Using tile 120-1 as an example, the time periods corresponding to descriptor 104-1 (e.g., search term) "Static" are shown with the color red in the line chart 122-1, such as segment 128-3; the time periods corresponding to descriptor 104-2 "sharply depreciating" are shown with the color green, such as segment 128-1 in the chart 122-1; and the time periods corresponding to descriptor 104-3 "quickly increasing" are shown with the color purple, such as segment 128-2 in the chart 122-1.

The text description 132 describes events that match the descriptors 104. In some embodiments, words in the text description that match the descriptors 104 are annotated (e.g., visually emphasized or have a different visual characteristic compared to other words in the text description). For example, tile 120-1 in FIG. 1A shows that the text description 132-1 includes a phrase 130-1 "sharply depreciating," which is shown in green and matches the corresponding segment 128-1 of the chart. The text description 132-1 includes a phrase 130-2 "quickly surging," which is visually emphasized with the color purple that matches the corresponding segment 128-2 of the chart 122-1. The text description 132-1 also includes a word 130-3 "static," which is shown in red and matches the corresponding segment 128-3 of the chart.

In some embodiments, the emphasized chart segments and corresponding text snippets are interactively and bi-directionally linked, thus providing a visual correspondence between the user's intent and the retrieved data. Hovering over a chart segment will fade out any other emphasized segments and will highlight the corresponding text in gray; hovering over a text snippet works similarly. If a stock has more than a predefined number of matches, the user can expand the tile (e.g., via selection of user-selectable affordance 134) to show a list of the rest of the matches, which can also be hovered over to display on the line chart.

System Architecture

Figure 1B:
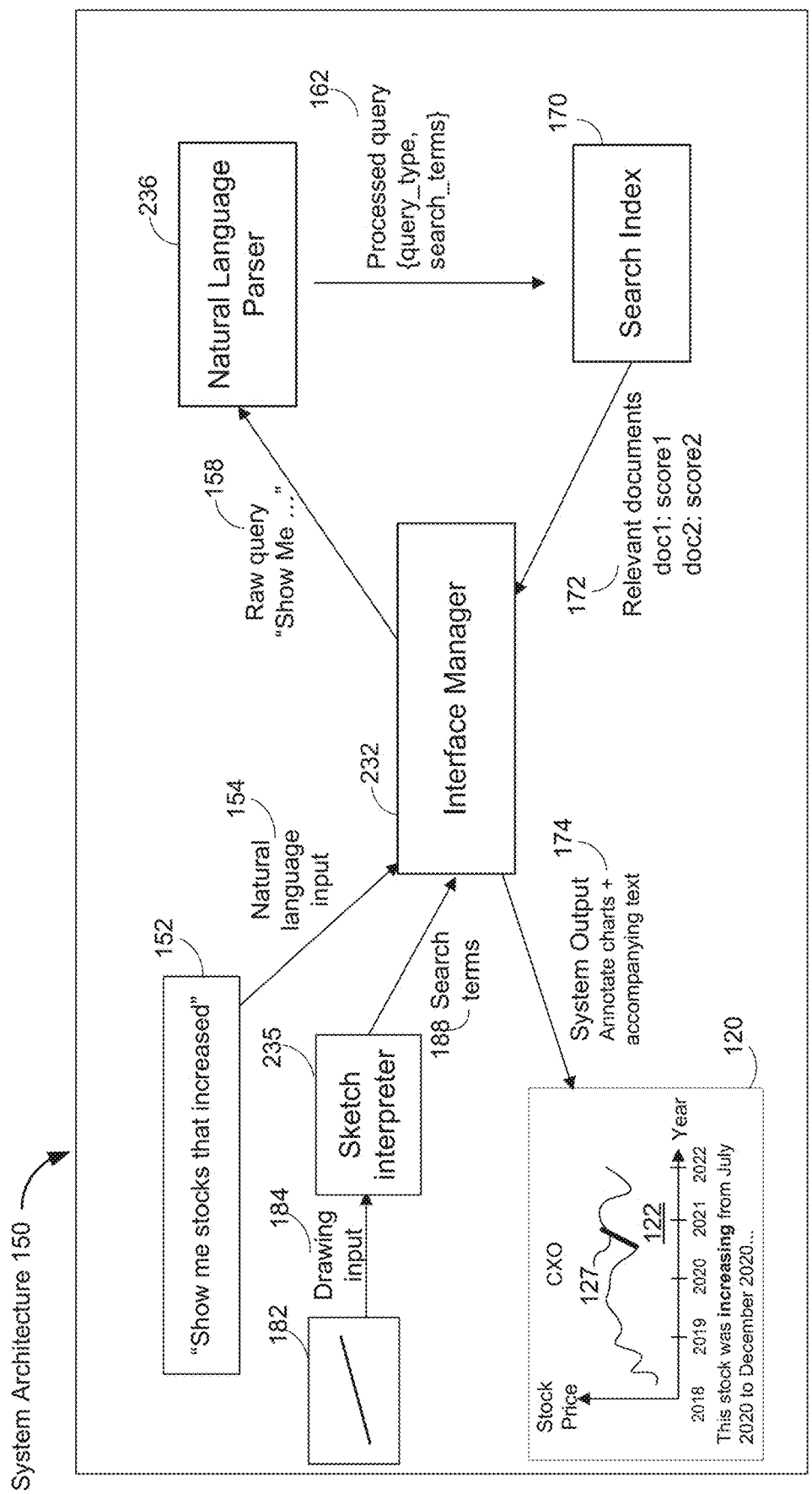
FIG. 1B illustrates an example system architecture for a system that supports querying of trends, in accordance with some embodiments.

FIG. 1B illustrates an example system architecture 150 for a system that supports querying of trends, in accordance with some embodiments.

In some embodiments, a user inputs a natural language query 152 (e.g., via natural language input box 102), the natural language input 154 is passed to an interface manager 232, which in turn passes a raw query 158 to a natural language parser 236 (e.g., semantic parser). The query is then processed (162) and the processed search terms are used to write queries to a search index 170 (e.g., an Elasticsearch index or other search indexing frameworks such as Solr, Sphinx, or OpenSearch). The search index 170 returns relevant labeled trend events 172 (and their respective scores) to the interface manager 232, which generates the system output 174 of charts and accompanying annotations and causes them to be displayed as tiles in the user interface 110.

In some embodiments, a user inputs a sketch 182 (e.g., via drawing input box 106). A sketch interpreter 235 converts the drawing input 184 into search terms 188, which is passed to the interface manager 232. In some embodiments, the interface manager 232 processes the search terms 188 the same way as described with respect to the natural language input 154 as described above, In some embodiments, the disclosed system is implemented as a web application, utilizing a Flask backend for server operations and React.js for rendering the user interface that features an SVG canvas for drawing vector sketches. To convert the sketch input into a set of quantifiable trend text descriptors, the system employs the Douglas-Peucker algorithm for line simplification and kernel density estimations (KDE) for labeling the system processes free-hand sketches. The descriptors are then used to query a set of indexed line chart trends stored in Elasticsearch to facilitate real-time indexing and search behavior.

Sketch Interpretation Module (Sketch Interpreter 235 or Sketch Interpretation Module 335)

The intuitiveness of sketching for supporting natural and user-friendly forms of expressing intent requires the use of techniques to decipher patterns that the free-form sketches represent. To convert hand-drawn lines and shapes into a set of quantitative semantic (QS) labels, the disclosed system implements the data-labeling algorithm described in U.S. Provisional Patent Application No. 63/543,070 and U.S. patent application Ser. No. 18/426,186, which are incorporated by reference herein in their entireties. In some embodiments, the algorithm in the aforementioned applications is modified to label the hand-drawn sketch data (e.g., in addition to data from a database).

FIG. 4 illustrates an algorithm for converting sketches to labels, in accordance with some embodiments. The system first linearizes the sketched lines using the Douglas-Peucker algorithm with an empirically derived epsilon value of 30 (FIG. 4, Alg1:1-3). The epsilon value is an error parameter that controls how closely the line segments adhere to the original data; in this case, an epsilon value of 30 consistently maintained hand-drawn detail without generating noise or becoming distracted by hand-drawn line imperfections. In principle, an epsilon parameter like this could be adjusted by a user to adapt the labeling algorithm to their sketching style. Following line linearization, angles and rotations (shapes) are calculated (FIG. 4, Alg1:4-5). The system then computes per-label kernel density estimations (KDEs) using angle and shape distribution data. For each 1D angle or 2D shape position, the system calculates probability densities against each label KDE. The label with the highest probability density at that position is used to label the angle or shape (FIG. 4, Alg1:8-17). Final angles and shapes are sorted by midpoint to establish temporal order (FIG. 4, Alg1:18-19). Note that aspect-ratio scaling is not necessary because the sketch panel and the data presentation have the same aspect ratio (3:1). Thus, the hand-sketched angle, the QS-labeled angle, and the expected data trend angle all align.

FIG. 5 illustrates examples of labeling hand-drawn trends with quantitative semantic (QS) labels, in accordance with some embodiments. The original drawing is shown in black. QS angle labels are in green and QS shape labels are in purple. Shape and angle lines overlap, so only the purple shape line is seen. Panel D in FIG. 5 shows an example of (1) hand-sketched line, (2) a linearized and labeled line segment, and (3) recovered data trend (blue). Note that in FIG. 5, D.1-D.3 all have aligning slopes.

Semantic Parser (e.g., Parser 236 or Parser Module 336)

In some embodiments, the system includes a semantic parser (e.g., natural language parser 236, parser 236, or parser module 336) for parsing trends that contain semantic labels, attributes, and temporal filter attributes. The semantic parser converts natural language inputs into structured representations, allowing for explicit reasoning, reduced ambiguity, and consistent interpretation. The semantic parser also provides the convenience of better traceability and are performant for structured tasks. In some embodiments, the semantic parser is combined with one or more large language models (LLMs) (e.g., LLM(s) 258 or LLM(s) 358). In some embodiments, in the combined semantic parser/LLM setup, the semantic parser is used for structured tasks and the LLMs are used for open-ended tasks in the context of a more comprehensive analytics tool.

In some embodiments, the semantic parser is implemented using Python's open-source NLP library, SpaCy, which employs compositional semantics to identify tokens and phrases based on their semantics to create a valid parse tree from the input search query. The semantic parser takes as input the individual tokens in the query and assigns semantic roles to these tokens. The semantic roles are one of four categories: (1) event_type (e.g., single event or multi-sequence event), (2) trend_terms (e.g., "tanking" and "plateau"), (3) attr (e.g., data attributes, data fields, or data field names, such as stock ticker symbols and company names), and (4) date_range (e.g., absolute date ranges and relative data ranges).

In some embodiments, the tokens and their corresponding semantic roles are translated into a machine-interpretable form that can be processed to retrieve relevant search results. Using an input search query "Show me when Alaska Airlines was tanking before November 2016" as an example, the parser output is as follows:

```
{
    'event\_type': 'single',
    'trend\_terms': ['tanking'],
    'attr': 'alaska airlines',
    'date\_range': {'lt': '2016-11-01'} # "before November 2016"
}
```

Search Module (237 or 337)

In some embodiments, the search module 237 (or search module 337) translates drawing inputs (e.g., sketches) or natural language inputs into text-based search queries, to find relevant trends that correspond to the pattern(s) expressed in the sketches or the natural language utterances. Utilizing the trend terms parsed by the sketch interpreter 235 (or sketch interpretation module 335), along with additional attributes and date ranges when specified, the system retrieves and ranks results from a set of indexed (e.g., labeled) trend events. Each trend event, represented as a document in Elasticsearch, comprises metadata, including chart ID, time points, and semantic labels that are indexed to facilitate efficient search and retrieval. This indexing phase enables full-text searches on labels, fuzzy matching for spelling variations, and n-grams for matching multi-word labels.

Indexing Phase (Search Index 170)

U.S. Provisional Patent Application No. 63/543,070 and U.S. patent application Ser. No. 18/426,186, which are incorporated by reference herein in their entireties, describe processes for generating labeled data for the stock prices. In some embodiments, each labeled trend event (considered a "document" for the search scenario disclosed herein) is added to the search index 170, wherein indexed documents are first retrieved and then ranked according to a match score. In some embodiments, the search index 170 (e.g., Elasticsearch) includes built-in scoring logic that is combined with a visual saliency score to produce a scoring mechanism tailored to the use case described herein. Finally, matching documents are grouped by their parent chart for presentation to a user (e.g., as tiles 120 in the user interface 110).

Indexing labeled trend events. The indexing phase creates indices for each of the labeled trend events in a dataset along with their metadata. Each document (i.e., a labeled event, corresponding to a portion of a line chart identified by a chart ID, start point, end point, and set of labels) is represented as a document vector $d_i$ where:

$$\mathcal{D} = \{d_1, d_2, \ldots, d_n\}$$

In some embodiments, n-gram string tokens are stored from these document vectors to support both partial (e.g., inexact) matches and exact matches at search time:

$$\mathcal{S} = \{s_1, s_2, \ldots, s_n\}$$

where $s_i = \varepsilon(d_i)$ for an encoding function e that converts each document vector into a collection of string tokens.

In some embodiments, the search index 170 performs synonym and edge n-gram processing according to specification in the search index settings.

In some embodiments, the search index 170 is configured to retrieve labeled trend events based on exact and partial (e.g., inexact) matches between the query tokens and the labeled data. A retrieved labeled trend event can be an exact match to at least one token (e.g., a user inputs or sketches a trend corresponding to "tanking," and a matching document would contain that word) or an inexact match to at least one token. An inexact match occurs when a search result is returned as a result of support for synonyms or edge n-gram matches.

An example of a synonym match is when a user types in the word "plummeting" and no labeled event contains that word "plummeting," but at least one labeled event contains the word "tanking," and the specification for the search index settings has specified that "plummeting" and "tanking" are synonyms.

An edge n-gram match occurs when the user only partially types in a search term and the search index can guess what the user means based on these first few letters. For instance, if the user types "dro", the search index would return documents that contain "dropping".

The original vectors D and encoded tokens S are stored in the semantic search engine index by specifying the mapping of the content, which defines the type and format of the fields in the index. The "content" refers to the raw event label for each document. For example, a label for an event could be "tanking." The "mapping" specifies how the content will be processed and interpreted by the search index 130 for storage as fields in the index. "Fields" are different ways of storing copies of documents' data in the search index 130 so that documents can be retrieved in various ways. The "type" (e.g., text type) and "format" of each field determines how it is stored and how documents can later be matched to search queries. For instance, a synonym field can take the label of "tanking" and map it to the synonym "plummeting" based on synonym specifications (e.g., specified in the search index settings), allowing this same document to be retrieved by user searches for either "tanking" or "plummeting." As another example, an edge n-gram field can take the same label of "tanking" and map it to shortened sub-strings of that label, such as 'tan', so that searching these sub-strings will also retrieve that document.

In other words, each semantic trend label and its associated stock data are stored as tokens in the search index in multiple processed formats (i.e., in different fields), enabling fast and flexible retrieval at search time. This indexing enables full-text search on the labels in the index, supporting exact-value search, fuzzy matching to handle typos and spelling variations, and n-grams for multi-word label matching. A scoring algorithm, tokenizers, and filters are specified as part of the search index settings. These settings specify how the matched documents are scored with respect to the input query, as well as the handling of tokens, including the conversion of tokens to lowercase and the addition of synonyms from a thesaurus.

FIG. 6 shows a code snippet for a search index configuration, in accordance with some embodiments. The scripted similarity in the search index configuration defines a custom scoring mechanism for ranking search results based on term frequency (tf), inverse document frequency (idf), and normalization. The search index configuration also incorporates synonym expansion and edge n-grams for more flexible and comprehensive search results. A synonym file "synonyms_final.txt" is used to expand or replace terms.

The contents of the synonym file are illustrated in FIGS. 7A and 7B, in accordance with some embodiments. Using the first line of FIG. 7A as an example, the term "subsiding" has synonyms "lessening," "lessen," "relaxing," "easing," and "abating." Thus, in some embodiments, a natural language query that includes the term "subsiding" would cause the search index to return the same set of labeled trend events as another natural language query that includes the term "easing."

FIG. 8 illustrates a code snippet for defining the properties of fields within an index mapping in the search index, in accordance with some embodiments.

Search (Individual Labeled Trend Events or "Documents")

The search phase can be conceptualized as having two steps—retrieval and ranking. For retrieval, consider a user input query q that is represented as a query vector Q with query tokens $q_1, q_2, \ldots, q_j$. $\hat{q}$ is encoded into string tokens using the same encoding function e from indexing, such that $\hat{s} = \varepsilon(\hat{q})$.

In the case of drawing inputs, when the sketch interpretation module processes the input sketch to produce a set of search tokens, the search module matches the tokens against the indexed documents to retrieve the most relevant results. Note that searches that include both descriptive and modifying terms are filtered to exclude partial matches that do not contain the descriptive term. This ensures that searches for specific trends, such as "gradual ascending," do not return unrelated trends like "quickly ascending," for example.

The search retrieval process (e.g., whether using natural language inputs or drawing inputs) returns the most relevant r document vectors $\mathcal{R} = \{d_1, d_2, \ldots, d_r\}$ based on the degree of overlap between the set of query string tokens $\hat{s}$ and the document string tokens in $\mathcal{S}$. As used herein, the "degree of overlap" refers to the magnitude of the set intersection (i.e., number of common tokens) between the set of query tokens and the set of document string tokens. The "most relevant" documents (i.e., labeled trend events) are a predefined number of labeled trend events (e.g., 1000, 800, 500, or 200) that have the greatest "degree of overlap" out of all documents.

In some embodiments, the scoring function $r_{max}$ maximizes search relevance as follows:

$$\{d_1, d_2, \ldots, d_r\} = r_{max \ i \in \{1,2,\ldots,n\}} |\hat{s} \cap s_i|$$

In some embodiments, for search inputs that contain both a noun/verb descriptor (e.g., "decline") and a modifying adjective (e.g., "fast"), the system subsequently filters out partially matching documents that contain only the adjective. For example, this would prevent a query of "fast decline" from returning documents labeled "fast increase" as partial matches. More formally, if $\hat{s}$ contains at least one token that matches a noun/verb descriptor in at least one document, then every matching document $d_i$ must contain that descriptor in its set of string tokens $s_i$. However, users may still enter search queries consisting only of an adjective and see documents where that adjective is paired with a variety of noun/verb descriptors.

After retrieval, system ranks document results (i.e., labeled trend event results) based on two components. The first component (e.g., ElasticSearch's BM25 scoring algorithm) concerns how precisely the search term matches the event labels of the document (i.e., labeled trend event), which is computed by the search index 170 according to the index and search settings. The BM25 algorithm considers factors such as term frequency (i.e., how often a search term appears in a document) and inverse document frequency (i.e., how unique the term is across all documents). Additionally, the scoring logic accounts for the length of the field being searched, giving a higher score to terms appearing in shorter fields as they are likely to be more relevant.

Consider a document with a single event label. In this example, a scoring scheme is utilized where this document's score is the frequency with which the search terms occur in its label, divided by the length of its label. This means that events with longer labels (e.g., those with modifying adjectives like "slow" or "fast") will be scored higher than events with shorter labels if and only if the additional tokens accounting for the added length match the search terms.

Consider a document $d_i$ with the label "slow climbing." For a user search of "slow climbing", the score for the $$\frac{2}{\sqrt{12}} \approx 0.577,$$

so the score for $d_1$ for this search would be 0.577. In this example, the numerator has value 2 because there are two search terms "slow" and "climbing" that match the user search input. The value of the denominator is 12 because there are 12 letters in the label.

Now consider that there is also another hypothetical document $d_2$ with the label "climbing," and imagine that the user searches for stocks that were "climbing". The label score for $d_1$ will be $$\frac{1}{\sqrt{12}} \approx 0.289$$

(because there is one search term "climbing" that matches the search input) while the label score for $d_2$ will be $$\frac{1}{\sqrt{8}} \approx 0.354,$$

demonstrating how longer labels with the same number of matching tokens are penalized for being less precise matches.

The second scoring component is the visual saliency score of the labeled event (see below). The visual saliency score quantifies the perceptual prominence of a trend event. It is specifically designed for the search scenario to favor the most visually salient events, motivated by prior research showing that text annotations corresponding to visually salient features of line charts are most effective at driving reader takeaways. The final composite score used to rank events in the results is then the product (e.g., multiplication) of the search index (e.g., Elasticsearch index, or other search indexing frameworks such as Solr, Sphinx, or OpenSearch) component and the visual saliency component.

In some embodiments, the visual saliency component of scoring is particularly important when there are a large number of matching results for a user query. Consider a case where a user is interested in "stocks that increased." There could feasibly be very many document results with a label of "increasing" which will all have identical (or at least very similar) search index scores (e.g., Elasticsearch scores). However, these results are not likely to all be of equal interest to the user. For instance, a short three-day increase in stock price is probably less interesting, both visually and in terms of the analytical task at hand, compared to a three-month increase during which much more stock value was gained. Note that these could both have similar slopes and thus identical labels. The visual saliency scoring component thus serves as a tiebreaker to boost results with greater prominence and relevance over others that share identical labels.

Bucketing

The indexed data and result scoring (discussed above) are at the level of the labeled trend event (e.g., document), where each labeled trend event is a labeled slope segment. Any individual chart (e.g., stock) could have multiple matching events for a query. It is for this reason that in the disclosed interface, events are not presented individually but are placed into buckets at search time based on their chart identifier (e.g., stock key). Events within a bucket are sorted by their composite score. Buckets themselves are also scored; the final score for each bucket is the sum of the composite scores of its individual events, and buckets are presented in sorted order according to this final score.

In accordance with some embodiments of the present disclosure, this scheme is designed to create an experience akin to standard "document search," where more matches in a bucket bump that bucket higher in the results.

Visual Saliency Scoring

Line chart annotations that emphasize the most visually prominent features of the chart are more effective at helping readers glean meaningful takeaways. To operationalize this concept during search, a way to quantify the visual saliency of each labeled trend event within its chart was established. Otherwise, it would be difficult to identify the most relevant results for a given search query when several matching results could have the same labels based on slope.

Figure 9:
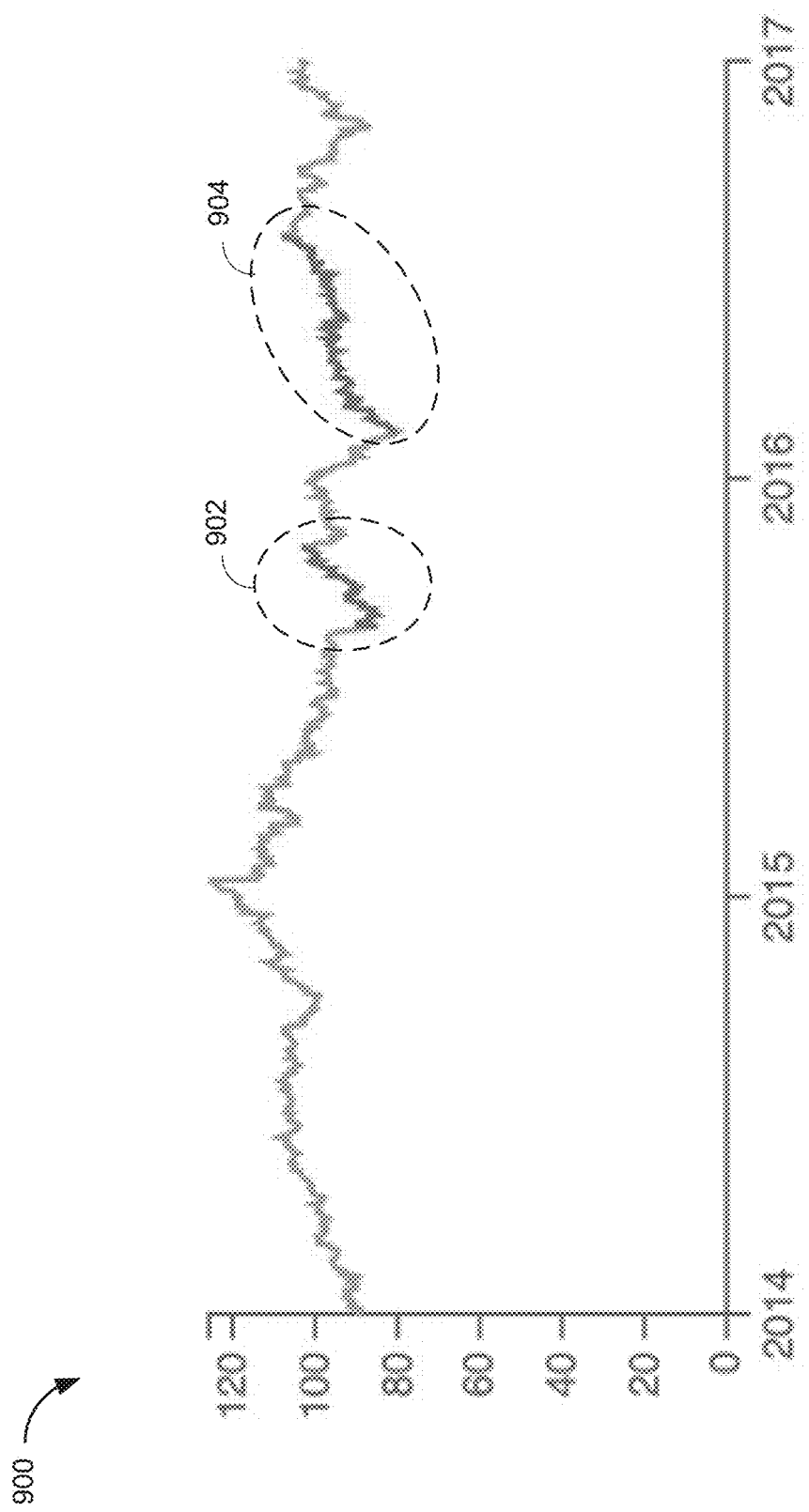
FIG. 9 illustrates an example of visual saliency, in accordance with some embodiments.

Consider the example of FIG. 9, which shows a line chart 900 that is output by the disclosed system in response to a natural language query or a drawing input that translates into the terms "gradually increasing." Although both segment 902 and segment 904 of the chart correspond to events that match the user query (e.g., based on slope), the event that occurred during 2016 (i.e., corresponding to segment 904) intuitively appears more prominent and impactful than the event in 2015 (segment 902).

The rationale behind the visual saliency scoring approach is to view each trend event as a vector that covers some of the encompassing chart's visual space in both the x direction (i.e., the temporal duration of the trend) and in the y direction (i.e., the data value delta over the course of the trend).

In some embodiments, an exemplary algorithm for computing visual saliency is as follows:
  for each trend result (single-segment slopes): do
    Compute the x vector component as the ratio of the entire time range taken up by the trend.
    Compute the y vector component as the ratio of the entire data value range taken up by the trend.
    Take these two vector components and use the Pythagorean theorem to compute the L2 norm.
  end for According to the algorithm above, the visual saliency computation for each trend event involves two steps: (1) Calculate the ratio of the chart's entire time range that the trend covers. This x vector component reflects the duration of the trend, and (2) Determine the y vector component that captures the extent of the trend's change in value. These two vector components are then combined to calculate the Euclidean norm, which provides a single score representing the trend's overall visual saliency.

In some embodiments, the visual saliency is determined using Equation 1 below:

$$\text{Visual Saliency Score} = \sqrt{\left(\frac{x_{event_{end}} - x_{event_{start}}}{x_{chart_{max}} - x_{chart_{min}}}\right)^2 + \left(\frac{y_{event_{end}} - y_{event_{start}}}{y_{chart_{max}} - y_{chart_{min}}}\right)^2} \quad (1)$$

In Equation (1), $x_{event_{start}}$ and $x_{event_{end}}$ are the data values on the x axis at the start and end of the event (and likewise for $y_{event_{start}}$ and $y_{event_{end}}$). $x_{chart_{max}}$ and $x_{chart_{min}}$ are, respectively, the maximum and minimum data values on the x axis over the entire time period of the chart (and likewise for $y_{chart_{max}}$ and $y_{chart_{min}}$). The higher this score, the more visually significant the trend is considered to be, as the pattern covers more of the trend's visual space either in terms of time duration, value range, or a combination of both. In the case of multiple matches, visual saliency serves as a tiebreaker, prioritizing results with patterns that visually match the labels describing the sketch. For example, a sustained increase in stock price over several months may be considered more visually salient—and therefore more relevant—than a brief spike over a few days despite both events being labeled as "increasing."

Block Diagrams

Figure 2A:
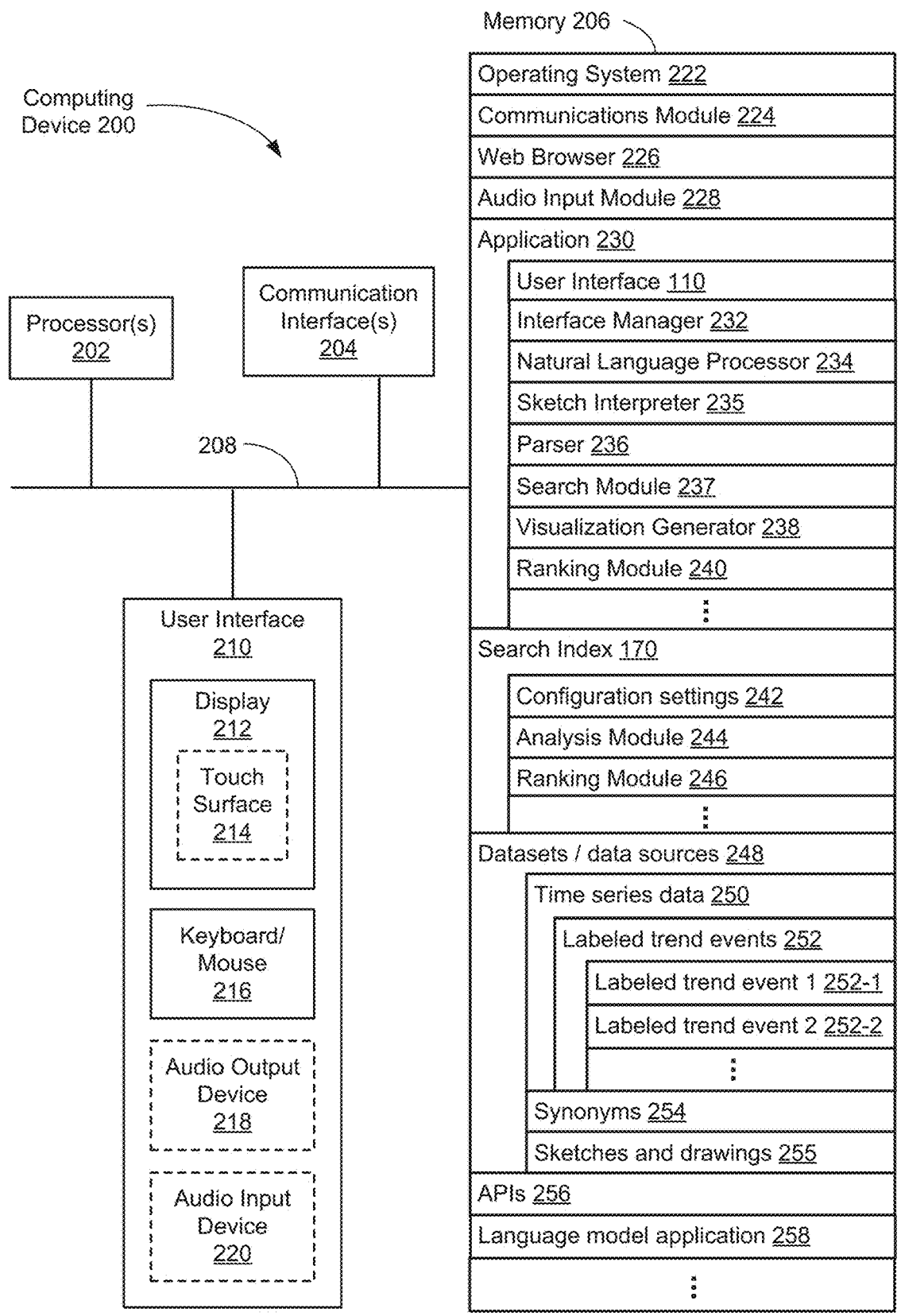
FIG. 2A provides a block diagram of a computing device, in accordance with some embodiments.

FIG. 2A is a block diagram of a computing device 200 for analyzing data trends, in accordance with some embodiments. Various examples of the computing device 200 include a desktop computer, a laptop computer, a tablet computer, and other computing devices that have a display and a processor capable of running a data visualization application 230. In some embodiments, the computing device 200 is a virtual reality (VR) device, an augmented reality (AR) device, or a spatial computing device that blends digital content with the physical world. The computing device 200 typically includes one or more processing units (processors or cores) 202, one or more network or other communication interfaces 204, memory 206, and one or more communication buses 208 for interconnecting these components. In some embodiments, the communication buses 208 include circuitry (sometimes called a chipset) that interconnects and controls communications between system components.

The computing device 200 includes a user interface 210. The user interface 210 typically includes a display device 212 (e.g., a display generation component). In some embodiments, the computing device 200 includes input devices such as a keyboard, mouse, and/or other input buttons 216. Alternatively or in addition, in some embodiments, the display device 212 includes a touch-sensitive surface 214, in which case the display device 212 is a touch-sensitive display. In some embodiments, the touch-sensitive surface 214 is configured to detect various swipe gestures (e.g., continuous gestures in vertical and/or horizontal directions) and/or other gestures (e.g., single/double tap). In computing devices that have a touch-sensitive display 214, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone and voice recognition to supplement or replace the keyboard. In some embodiments, the computing device 200 includes an audio input device 220 (e.g., a microphone) to capture audio (e.g., speech from a user).

In some embodiments, the memory 206 includes high-speed random-access memory, such as DRAM, SRAM, DDR RAM, or other random-access solid-state memory devices. In some embodiments, the memory 206 includes non-volatile memory, such as one or more magnetic disk storage devices, optical disk storage devices, flash memory devices, or other non-volatile solid-state storage devices. In some embodiments, the memory 206 includes one or more storage devices remotely located from the processors 202. The memory 206, or alternatively the non-volatile memory devices within the memory 206, includes a non-transitory computer-readable storage medium. In some embodiments, the memory 206, or the computer-readable storage medium of the memory 206, stores the following programs, modules, and data structures, or a subset or superset thereof:
- an operating system 222, which includes procedures for handling various basic system services and for performing hardware dependent tasks;
- a communications module 224, which is used for connecting the computing device 200 to other computers (e.g., server 300) and devices via the one or more communication interfaces 204 (wired or wireless), such as the Internet, other wide area networks, local area networks, metropolitan area networks, and so on;
- a web browser 226 (or other application capable of displaying web pages), which enables a user to communicate over a network with remote computers or devices;
- an audio input module 228 (e.g., a microphone module), which processes audio captured by the audio input device 220. The captured audio may be sent to a remote server (e.g., a server system 300) and/or processed by an application executing on the computing device 200 (e.g., the application 230 or the natural language processor 234);
- an application 230 for analyzing data trends. In some embodiments, the application 230 includes:
  - a user interface 110 (e.g., as illustrated in FIG. 1A). The user interface 110 displays data visualizations (e.g., charts and line plots) and text snippets in response to the inputs;
  - an interface manager 232 (see, e.g., FIG. 1B), which receives natural language inputs and drawing inputs via user interface 110, passes the queries to a parser 236 (e.g., a semantic parser) (and/or a natural language processor 234) for processing, receives relevant labeled trend events (e.g., documents) from a search index 170, and generates outputs that include charts, accompanying annotations, and/or text snippets;
  - a natural language processor 234, which processes natural language queries;
  - a sketch interpreter 235, which converts the drawing input into a set of search terms (e.g., labels). In some embodiments, the sketch interpreter executes an algorithm such as the algorithm depicted in FIG. 4 to convert drawing inputs to search terms;
  - a parser 236 (e.g., a semantic parser) for parsing trends that contain semantic labels, attributes, and temporal filter attributes;
  - a search module 237 for translating drawing inputs or natural language inputs into text-based search queries, to find relevant trends that correspond to the pattern(s) expressed in the sketches or the natural language utterances;
  - a visualization generator 238, which generates and displays data visualizations (e.g., line charts) and accompanying annotations, and text snippets; and
  - an optional ranking module 240, which ranks labeled trend event results returned from the search index 170. In some embodiments, the ranking module 240 ranks the results based on how precisely the search terms matches the event labels of the document. In some embodiments, the ranking module 240 ranks the results based on a visual saliency score of the labeled event.
- a search index 170. In some embodiments, the search index 170 is a search engine such as Elasticsearch, or other search indexing frameworks such as Solr, Sphinx, or OpenSearch. In some embodiments, the search index 170 includes:
  - configuration settings 242 (e.g., configuration specifications), which define the requirements for analysis and indexing;
  - an analysis module 244, which processes query string tokens and retrieves the most relevant labeled events based on the degree of overlap between the set of query string tokens and the document string tokens; and
  - a ranking module 246, which ranks labeled trend event results returned from the search index 130. In some embodiments, the ranking module 246 ranks the labeled trend event results by computing a respective label score and a respective visual saliency score for each labeled trend event that was returned from the search index 130;
- zero or more datasets or data sources 248, which are used by the application 230, the search index 170, and/or the language model application 258. In some embodiments, the datasets/data sources 248 include time series data 250. An example of time series data is data of stock prices over time. Other examples of time series data in other domains include healthcare trends, economic data trends, and climate patterns. The time series data includes labeled trend events 252, such as a first labeled trend event 252-1 and a second labeled trend event 252-2. In some instances, the time series data 250 includes 1000, 5000, 10,000, 50,000, 100,000, or over 100,000 labeled trend events. FIG. 2B shows a block diagram of a labeled trend event 252-1 in accordance with some embodiments. In some embodiments, a labeled trend event 252-1 corresponds to a portion of a line chart and is identified by a chart ID 262-1, a start point 264-1, an end point 266-1, and set of one or more labels 268-1. In some embodiments, a user selects one or more datasets/data sources 248 (which may be stored on the computing device 200 or stored remotely) and input queries are directed to the selected dataset/data sources. In some embodiments, a dataset or data source 248 includes a set of synonyms 254 for data values, data field names, and/or trend analysis labels. In some embodiments, the datasets or data sources 248 includes sketches and drawings 255;
- APIs 256 for receiving API calls from one or more applications (e.g., a web browser 226, an application 230, a search index 130, and/or a language model application 258), translating the API calls into appropriate actions, and performing one or more actions; and
- a language model application 258, which executes one or more large language models (LLMs).

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some embodiments, the memory 206 stores a subset of the modules and data structures identified above. Furthermore, the memory 206 may store additional modules or data structures not described above. In some embodiments, a subset of the programs, modules, and/or data stored in the memory 206 is stored on and/or executed by a server system 300.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to the computing device 200 may be stored or executed on a server system 300.

Figure 3:
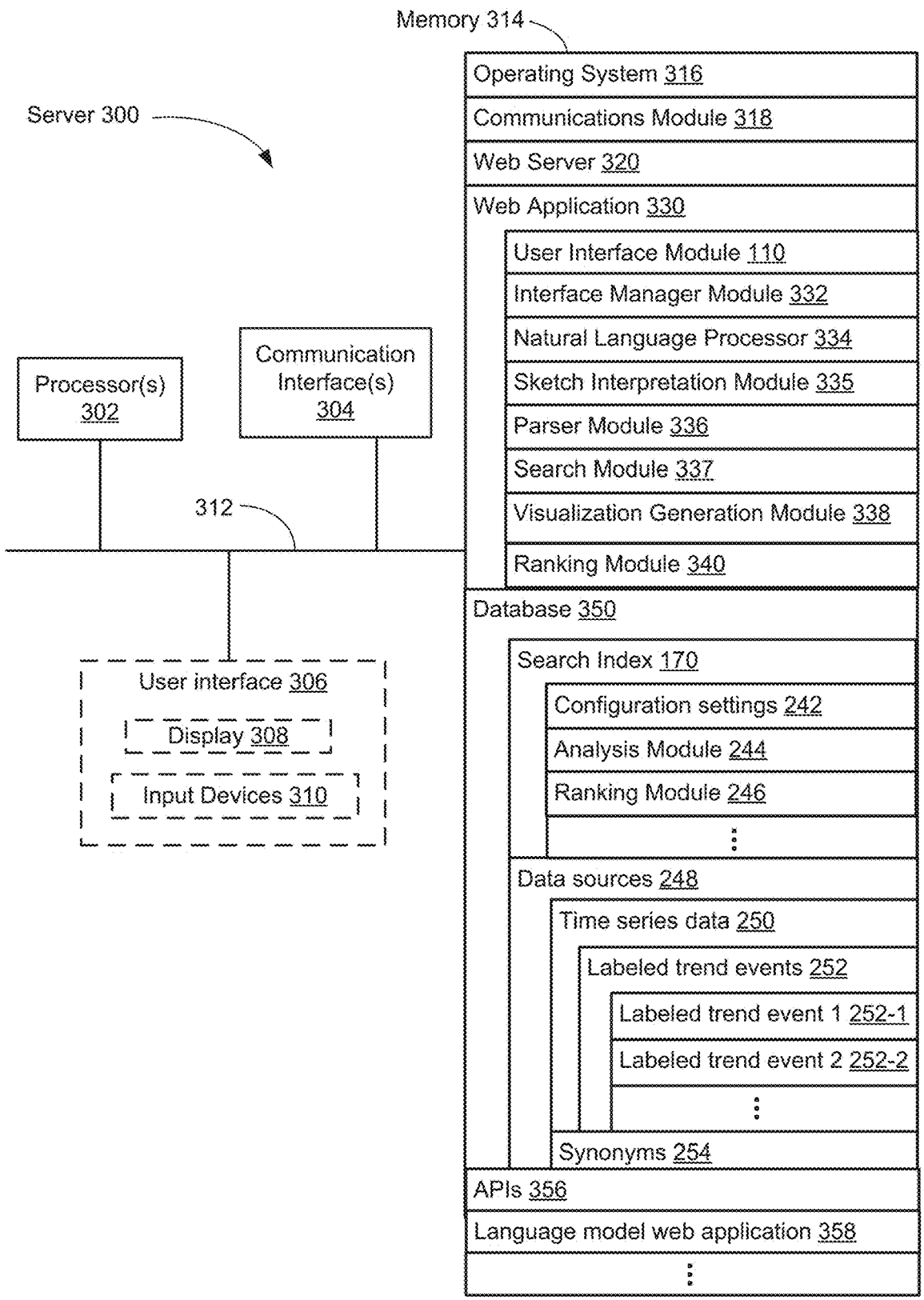
FIG. 3 provides a block diagram of a server system, in accordance with some embodiments.

FIG. 3 is a block diagram of a server system 300, in accordance with some embodiments. The server system 300 typically includes one or more processing units/cores (CPUs) 302, one or more network interfaces 304, memory 314, and one or more communication buses 312 for interconnecting these components. In some embodiments, the server system 300 includes a user interface 306, which includes a display 308 and one or more input devices 310, such as a keyboard and a mouse. In some embodiments, the communication buses 312 include circuitry (sometimes called a chipset) that interconnects and controls communications between system components.

In some embodiments, the memory 314 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. In some embodiments, the memory 314 includes one or more storage devices remotely located from the CPUs 302. The memory 314, or alternatively the non-volatile memory devices within the memory 314, comprises a non-transitory computer readable storage medium.

In some embodiments, the memory 314 or the computer readable storage medium of the memory 314 stores the following programs, modules, and data structures, or a subset thereof:
- an operating system 316, which includes procedures for handling various basic system services and for performing hardware dependent tasks;
- a network communications module 318, which is used for connecting the server 300 to other computers via the one or more communication network interfaces 304 (wired or wireless) and one or more communication networks, such as the Internet, other wide area networks, local area networks, metropolitan area networks, and so on;
- a web server 320 (such as an HTTP server), which receives web requests from users and responds by providing responsive web pages or other resources;
- a web application 330 for analyzing data trends. In some embodiments, the web application 330 may be downloaded and executed by a web browser 226 on a user's computing device 200. In general, a web application 330 has the same functionality as a desktop application 230, but provides the flexibility of access from any device at any location with network connectivity, and does not require installation and maintenance. In some embodiments, the web application 330 includes various software modules to perform certain tasks, such as:
  - a user interface module 110, which provides the user interface for all aspects of the web application 330;
  - an interface manager module 332, which has the same functionality as interface manager 232;
  - a natural language processor 334, which has the same functionality as natural language processor 234;
  - a sketch interpretation module 335, which has the same functionality as sketch interpreter 235;
  - a parser module 336, which has the same functionality as parser 236;
  - a search module 337, which has the same functionality as search module 237;
  - a visualization generation module 338, which generates and displays data visualizations (e.g., line charts) and accompanying annotations, and text snippets; and
  - an optional ranking module 340, which has the same functionality as the optional ranking module 240.

In some embodiments, the server system 300 includes a database 350. In some embodiments, the database 350 includes a search index 170, which is described in FIG. 1A and the section above. In some embodiments, the search index 170 includes:
- configuration settings 242 (e.g., configuration specifications), which define the requirements for analysis and indexing;
- an analysis module 244, which processes query string tokens and retrieves the most relevant labeled events based on the degree of overlap between the set of query string tokens and the document string tokens; and
- a ranking module 246, which ranks labeled trend event results returned from the search index 130. In some embodiments, the ranking module 246 ranks the labeled trend event results by computing a respective label score and a respective visual saliency score for each labeled trend event that was returned from the search index 130;

In some embodiments, the database 350 includes zero or more datasets or data sources 248, which are used by the web application 330, the search index 170, and/or the language model web application 358. In some embodiments, the datasets/data sources 248 include time series data 250. The time series data includes labeled trend events 252, such as a first labeled trend event 252-1 and a second labeled trend event 252-2, as described in FIGS. 2A and 2B. In some embodiments, a data source 248 includes synonyms 254 for data values, data field names, and/or trend labels.

In some embodiments, the memory stores APIs 356 for receiving API calls from one or more applications (e.g., a web server 320, a web application 330, a search index 130, and/or a language model web application 358), translating the API calls into appropriate actions, and performing one or more actions.

In some embodiments, the memory 314 stores a language model web application 358 that executes one or more LLMs.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some embodiments, the memory 314 stores a subset of the modules and data structures identified above. Furthermore, the memory 314 may store additional modules or data structures not described above.

Although FIG. 3 shows a server system 300, FIG. 3 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server system 300 may be stored or executed on a computing device 200. In some embodiments, the functionality and/or data may be allocated between a computing device 200 and one or more servers 300. Furthermore, one of skill in the art recognizes that FIG. 3 need not represent a single physical device. In some embodiments, the server functionality is allocated across multiple physical devices in a server system. As used herein, references to a "server" include various groups, collections, or arrays of servers that provide the described functionality, and the physical servers need not be physically colocated (e.g., the individual physical devices could be spread throughout the United States or throughout the world).

Figure 10A:
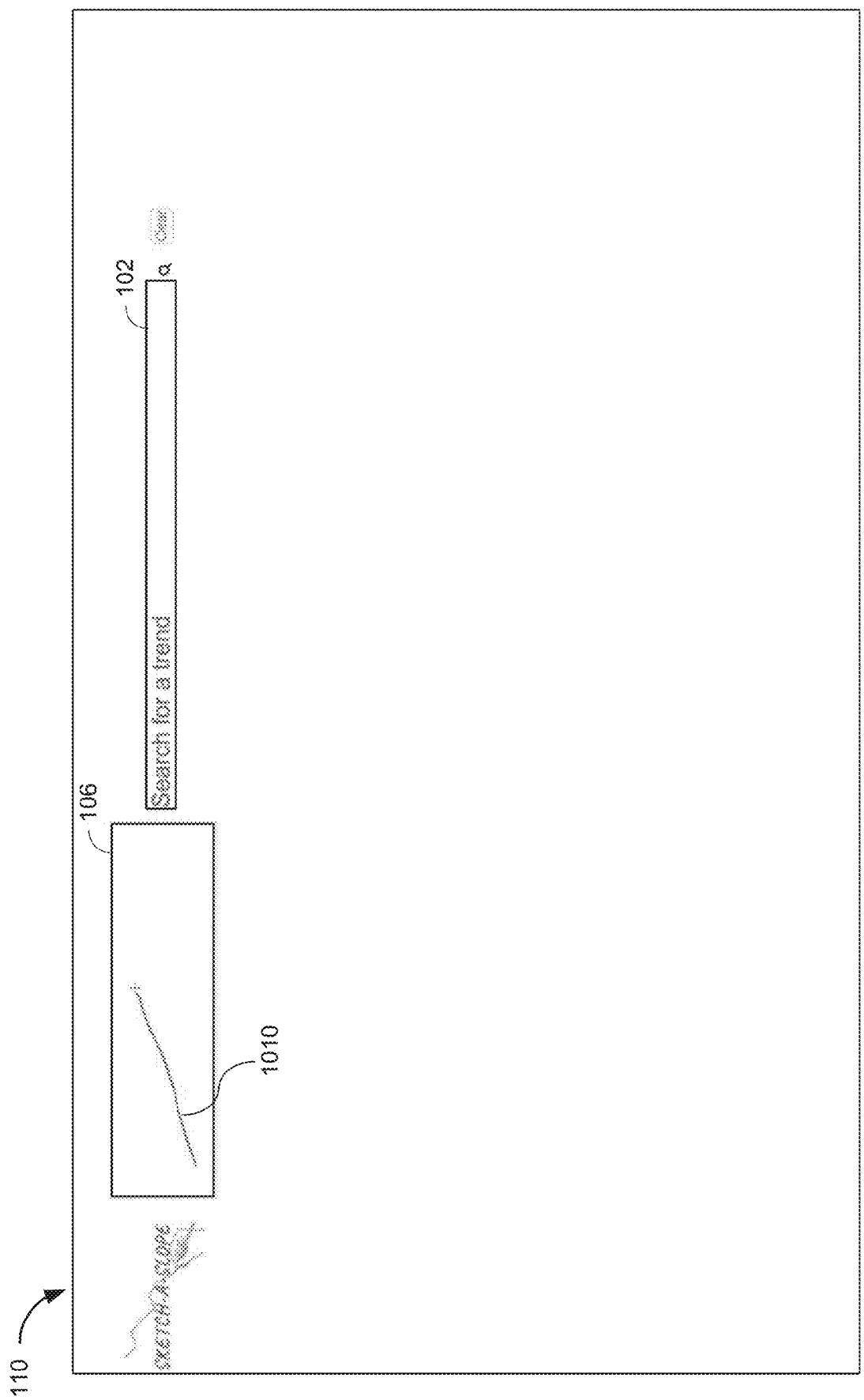
FIGS. 10A to 10C are screenshots illustrating the use of a system to search for a gradual increase trend, in accordance with some embodiments.
Figure 10B:
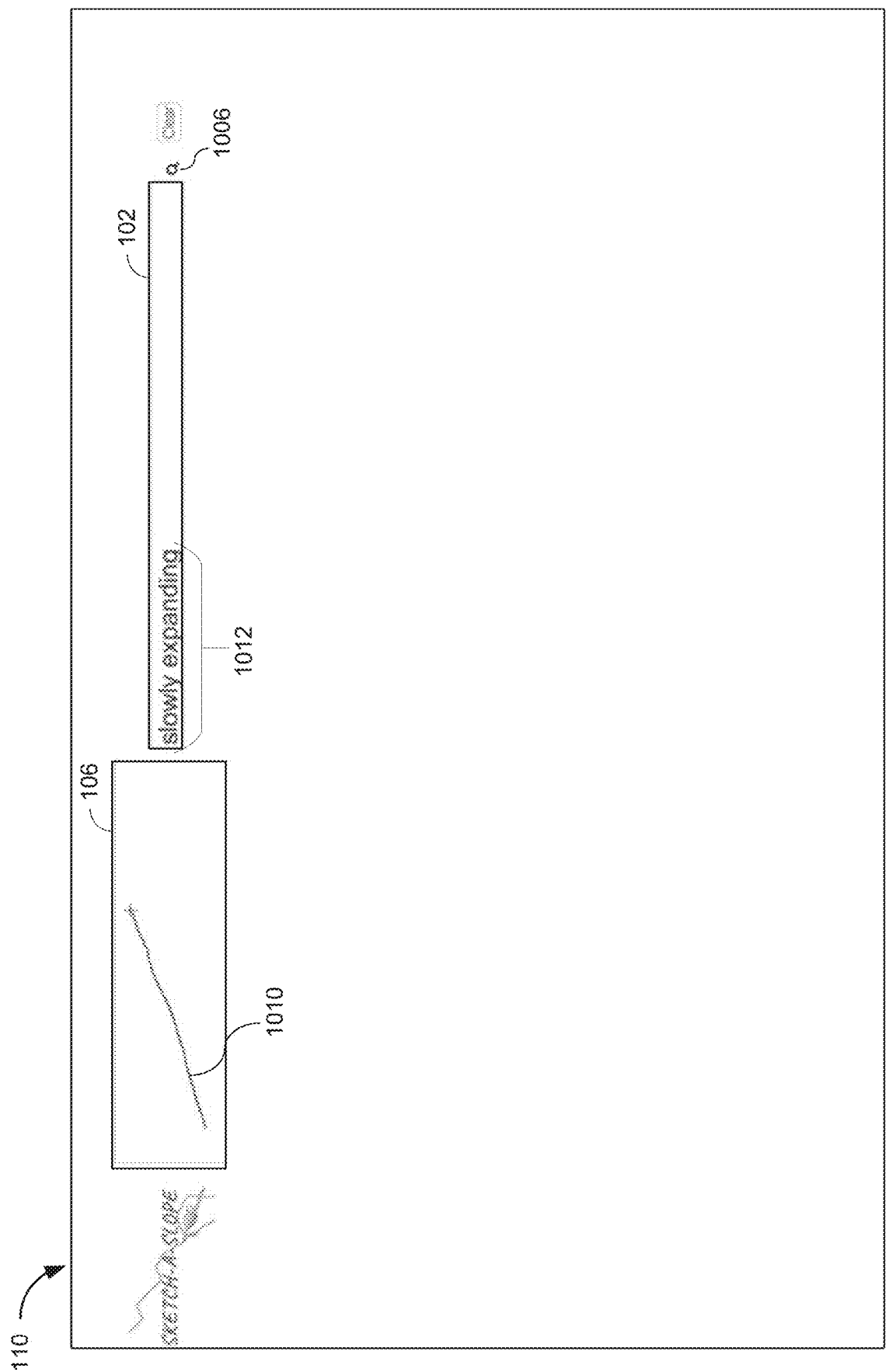
Figure 10C:
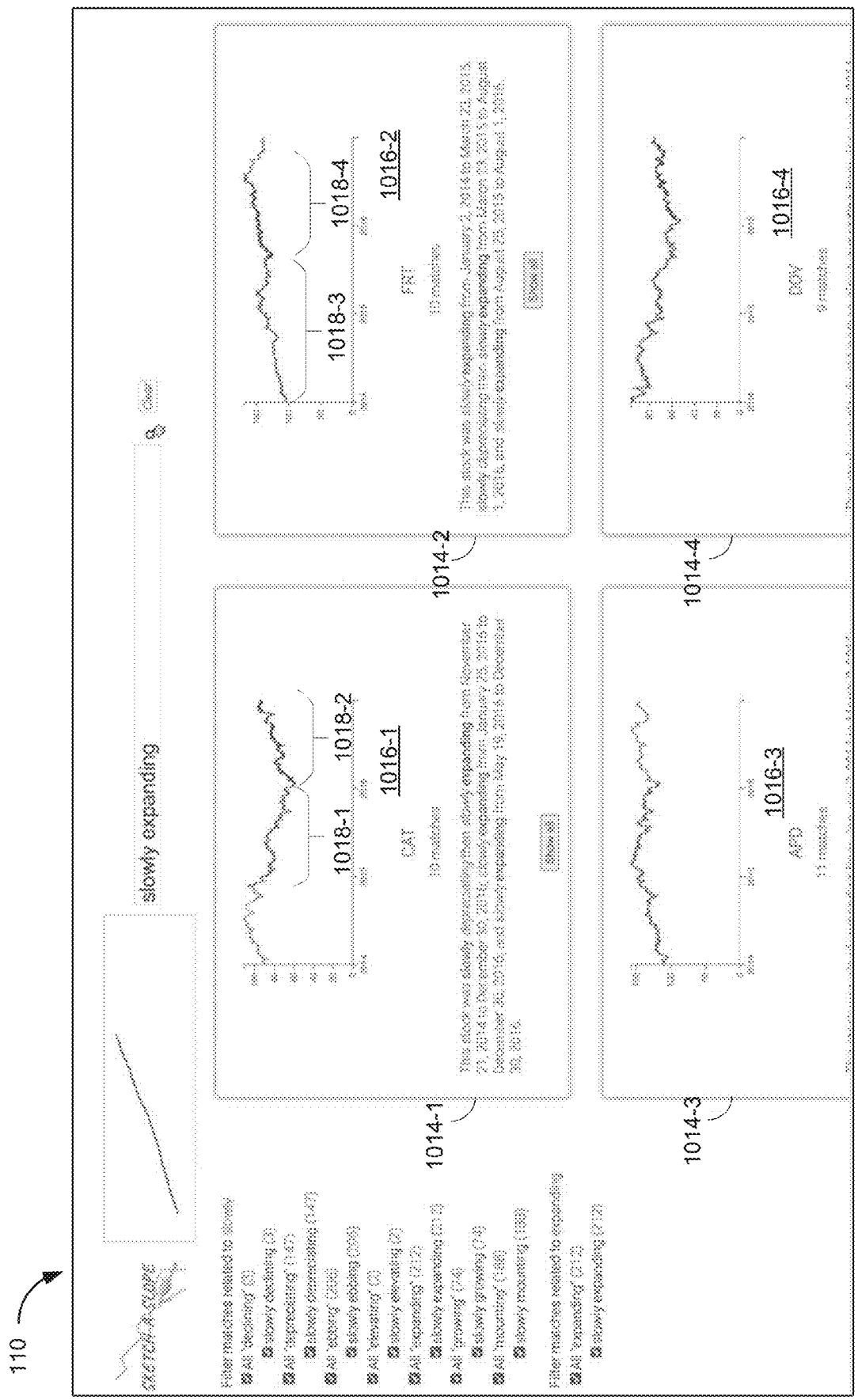

FIGS. 10A to 10C are screenshots illustrating the use of the disclosed system to search for a gradual increase trend using drawing inputs, in accordance with some embodiments.

FIG. 10A illustrates the user interface 110. As discussed previously in FIG. 1A, the user interface 110 includes natural language input box 102 (e.g., a search bar) and drawing input box 106 (e.g., a drawing region). Examples regarding the use of natural language inputs to search for data trends can be found in U.S. Provisional Patent Application No. 63/543,070, U.S. patent application Ser. No. 18/426,186, and U.S. patent application Ser. No. 18/426,192, the contents of which are incorporated by reference herein in their entirety.

The drawing input box 106 allows for querying by drawing the desired trend directly on the interface 110. FIG. 10A shows a drawing input 1010 that is received by the user interface 110 via the drawing input box 106. In some embodiments, the drawing input 610 is a sketch that is drawn using a user's finger, a mouse, or a stylus. In some embodiments, the user interface 110 is a virtual user interface (e.g., the computing device is an AR/VR computing device or a spatial computing device) and the drawing input 1010 can comprise a pinch and/or hold gesture that is received by the virtual user interface.

FIG. 10B shows that in response to receiving the drawing input 1010, the computing device 200 (e.g., executing the application 230) converts the drawing input 1010 to a text-based semantic trend descriptor, and automatically displays a search term 1012 "slowly expanding," corresponding to the trend descriptor, in the natural language input box 102. In some embodiments, the user may select the search icon 1006 to execute a query against a search index to search for data (e.g., stock data, trend data) in a dataset that matches the trend "slowly expanding." In some embodiments, the application 230 automatically executes the query against the search index when the drawing input is converted to a set of search terms.

In FIG. 10C, the user interface 110 displays results (e.g., as tiles 1014, such as 1014-1 to 1014-4) corresponding to the query. In this example, each of the results includes a respective chart 1016 (e.g., a line chart) showing stock prices over time. A respective chart 1016 can include one or more highlighted segments 1018 (e.g., visually emphasized segments, or segments that are encoded in a different color compared to the rest of the chart), corresponding to one or more specific events on the chart. In FIG. 10C, each of the segments 1018 corresponds to an event with a "slow" label. FIG. 10C shows that in some embodiments, in addition to highlighting segments that match the trend "slowly expanding," such as segments 1018-2 and 1018-4, the tool also highlights segments that match the word "slowly," such as the segment 1018-1 corresponding to a "slowly depreciating" trend.

Figure 11A:
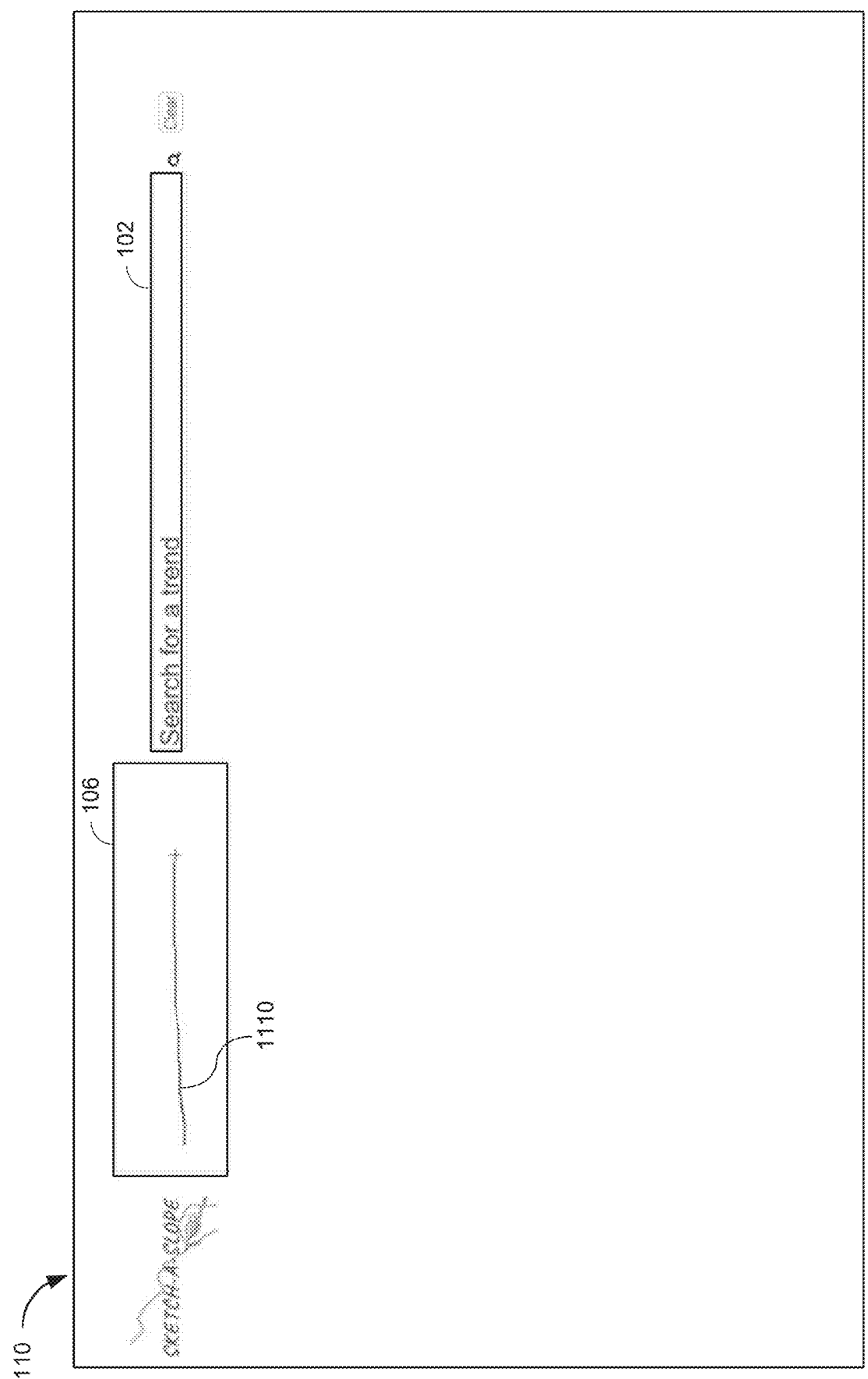
FIGS. 11A to 11C are screenshots illustrating the use of a system to search for a static trend, in accordance with some embodiments.
Figure 11B:
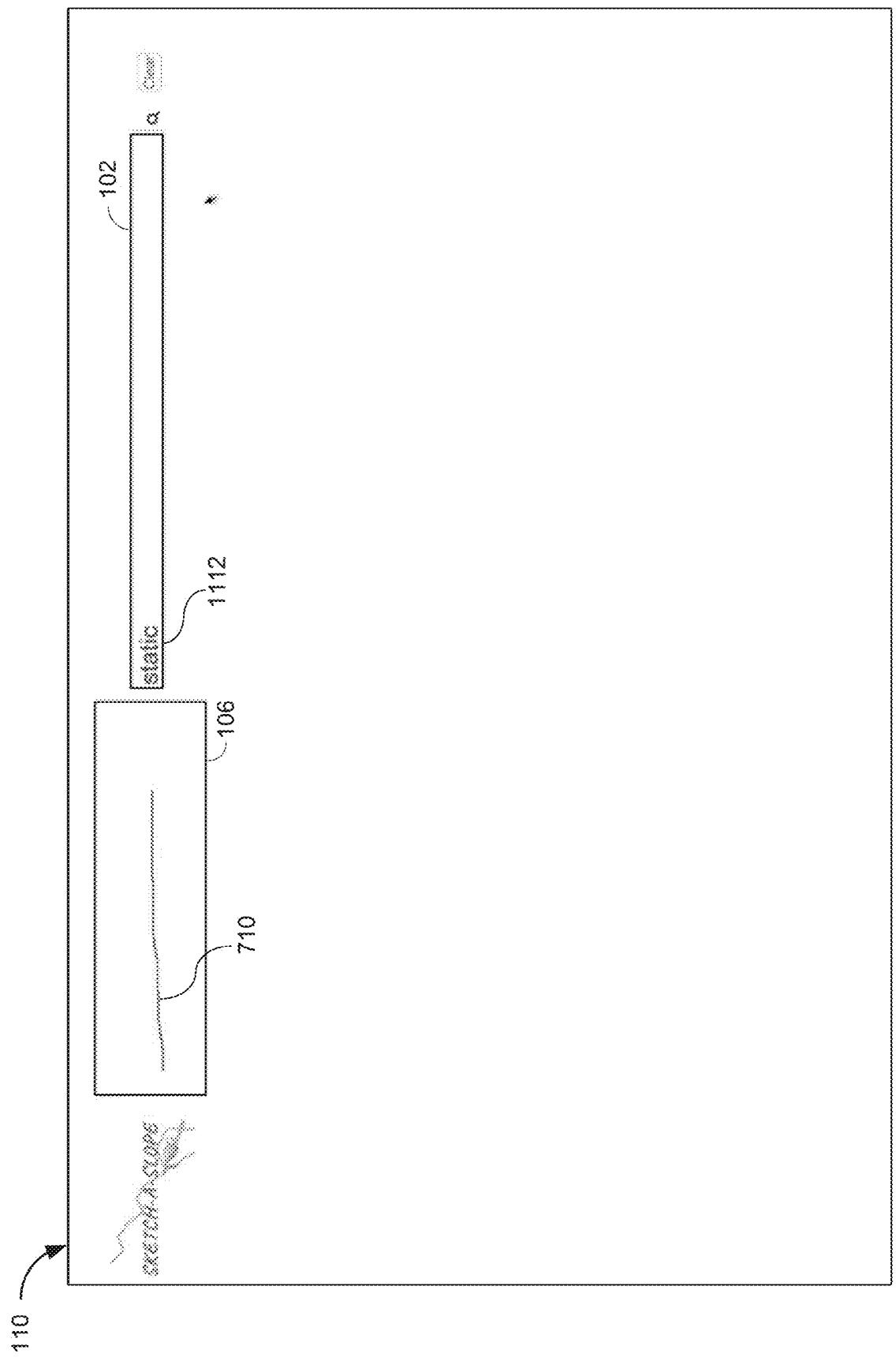
Figure 11C:
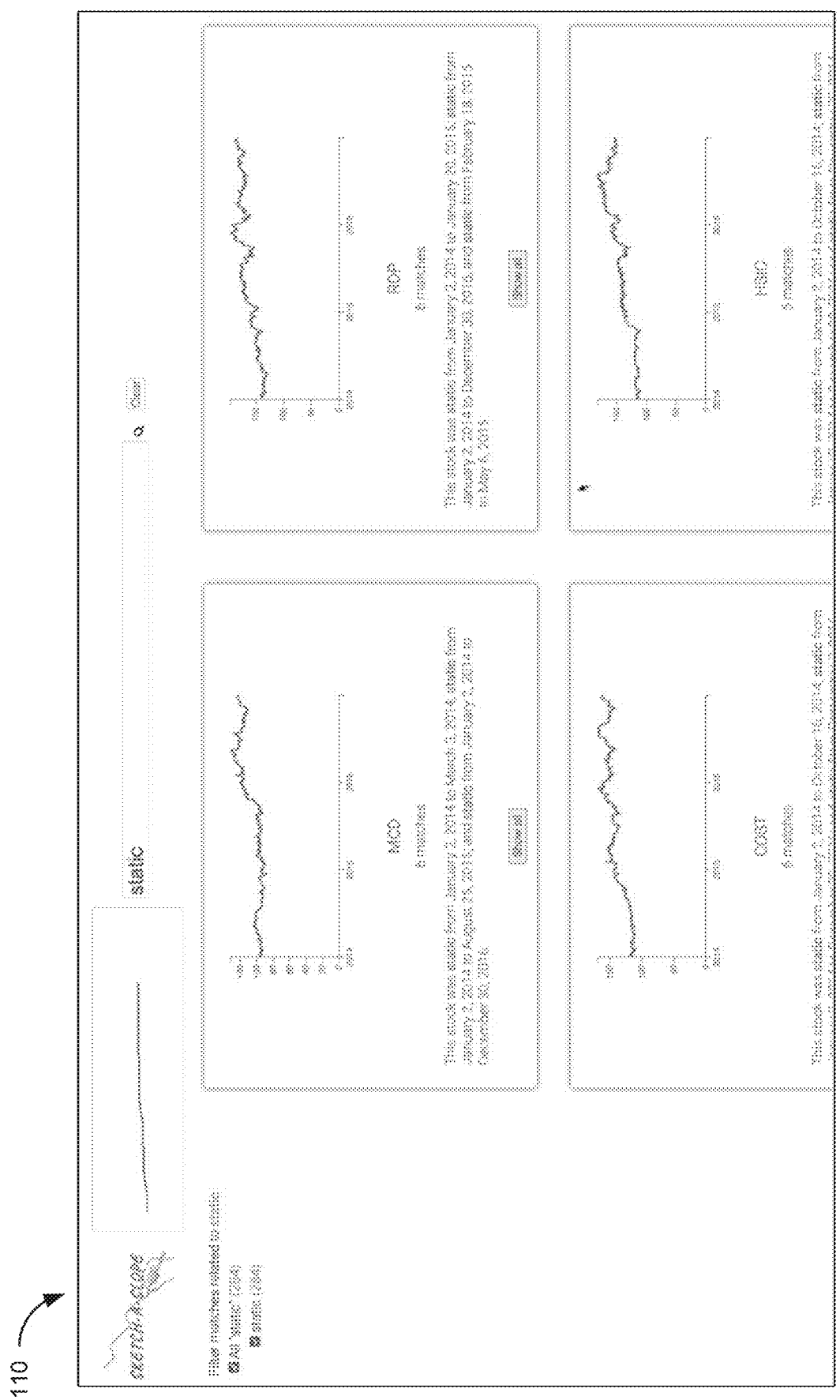

FIGS. 11A to 11C are screenshots illustrating the use of the disclosed system to search for a static trend, in accordance with some embodiments. In this example, a user may be interested in identifying stocks whose prices remain steady over a period of time. In FIG. 11A, a sketch 1110 of the relatively flat line is input in the drawing input box 106. FIG. 11B shows that the user interface 110 displays (e.g., automatically, without user input) a term "static" 1112 in accordance with the input sketch 710. FIG. 11C shows that the user interface 110 displays results corresponding to the query.

Figure 12A:
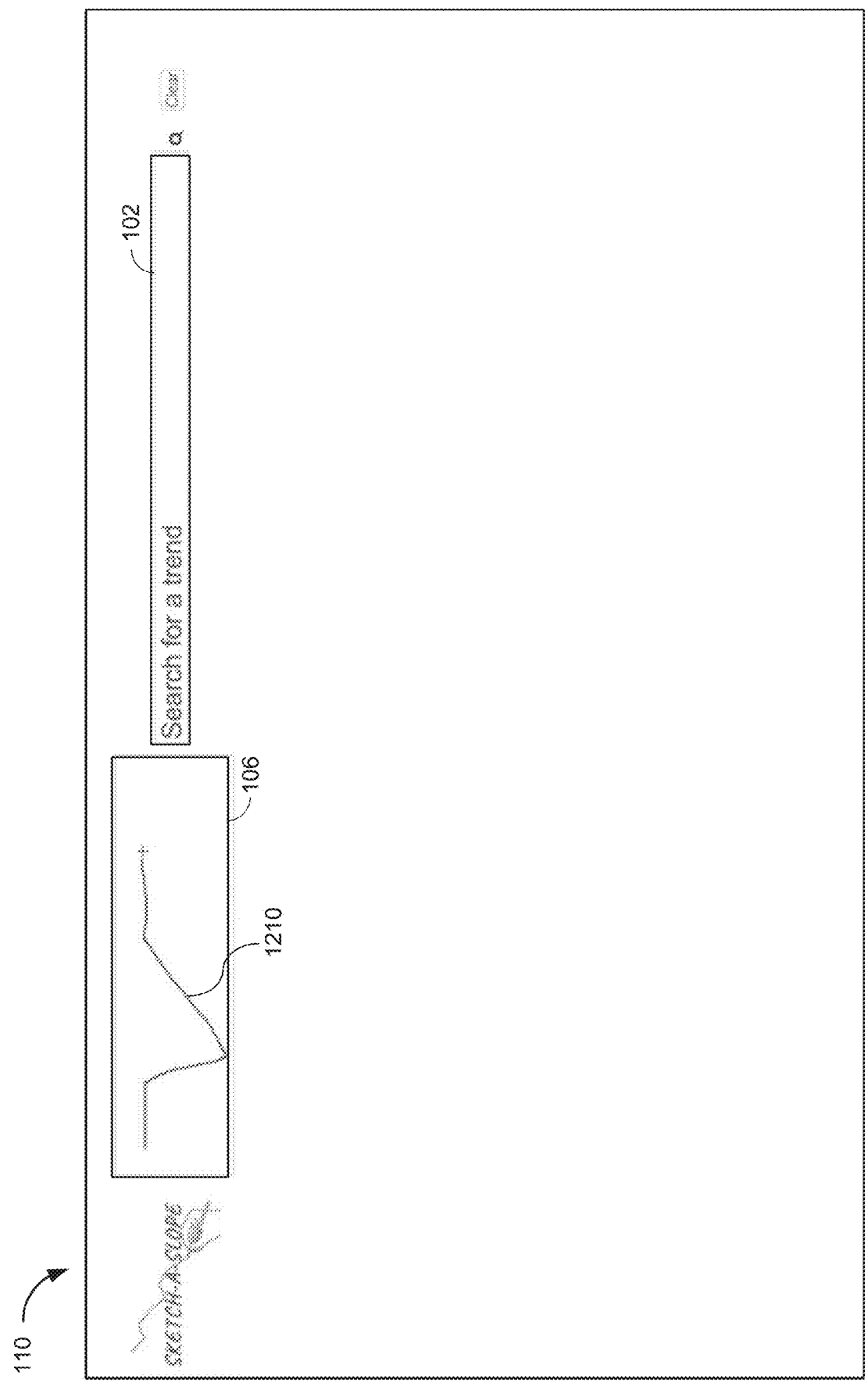
FIGS. 12A to 12C are screenshots illustrating the use of a system to search for a dip trend, in accordance with some embodiments.
Figure 12B:
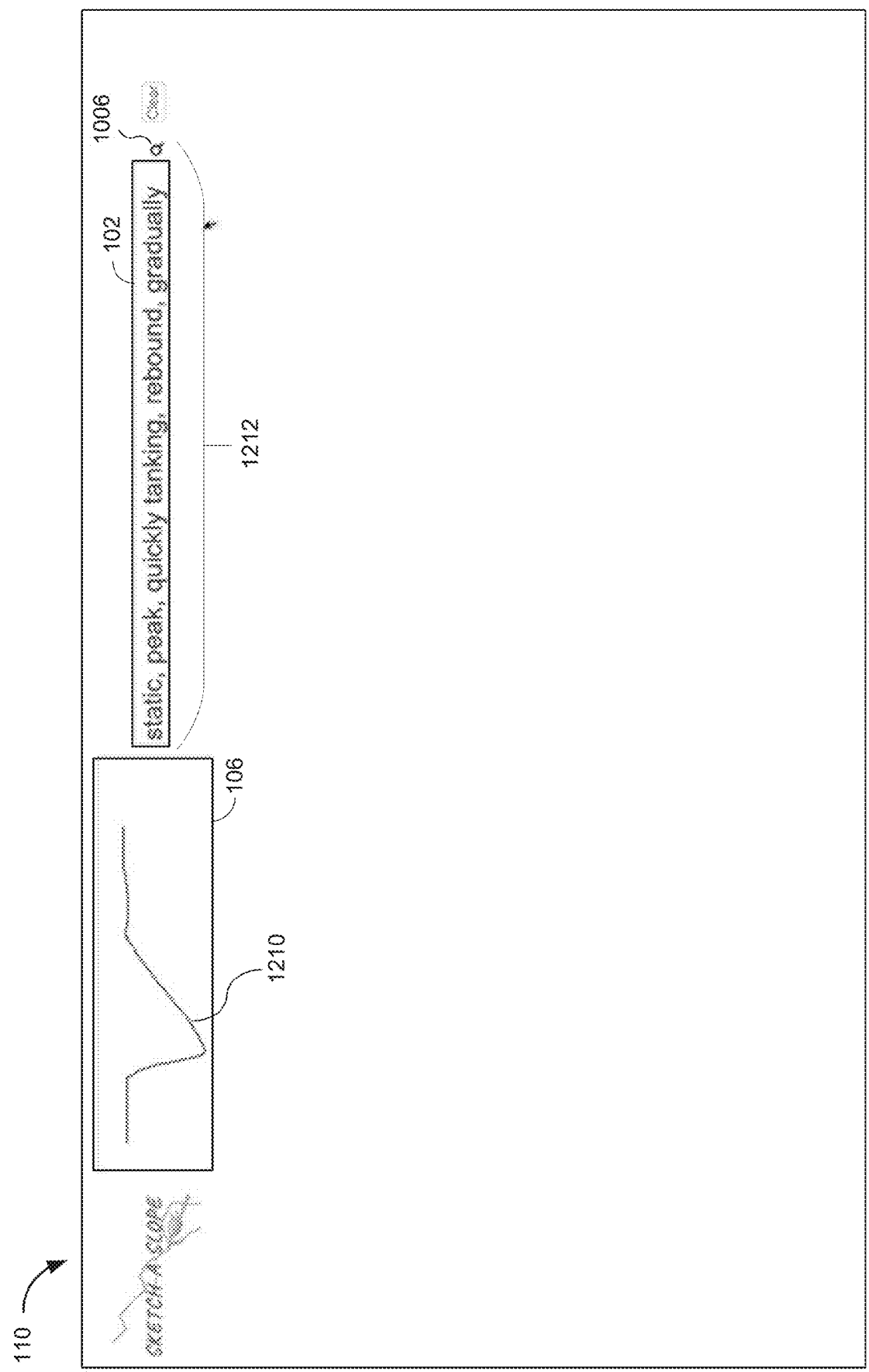
Figure 12C:
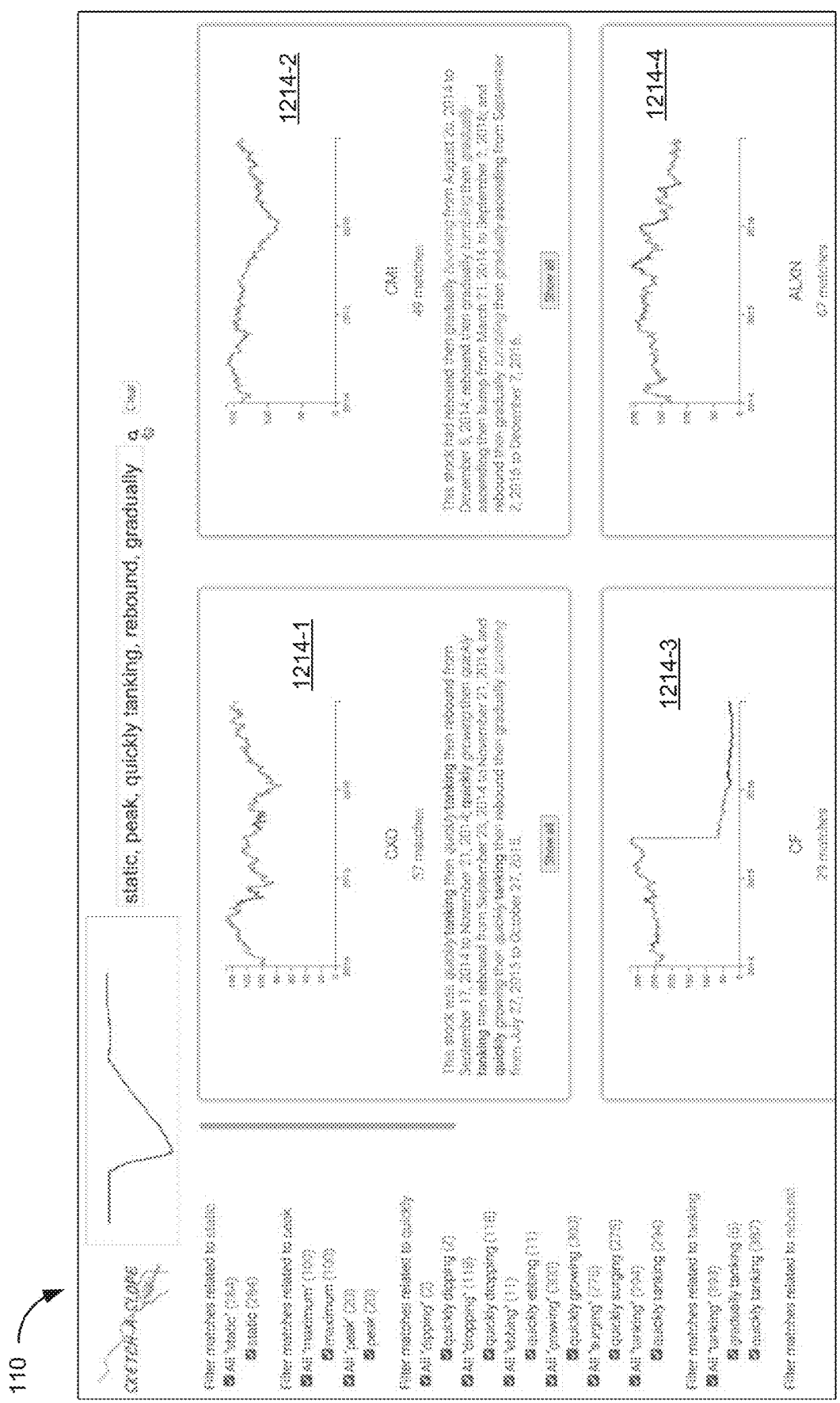

FIGS. 12A to 12C are screenshots illustrating the use of the disclosed system to search for a dip trend, in accordance with some embodiments. Encountering unexpected dips is crucial for timely business decisions. In FIG. 12A, the user interface 110 receives a drawing input 1210 that represents stocks that have experienced a sudden drop. FIG. 12B shows that in response to receiving the drawing input 1210, the user interface 110 determines the trends and outputs the trend terms 1212 "static, peak, quickly tanking, rebounds, gradually." In some embodiments, in response to user selection of the search icon 1006, the user interface 110 displays stocks 814 (e.g., 814-1 to 814-4) with trends matching the trend terms 1212, as illustrated in FIG. 12C.

Figure 13A:
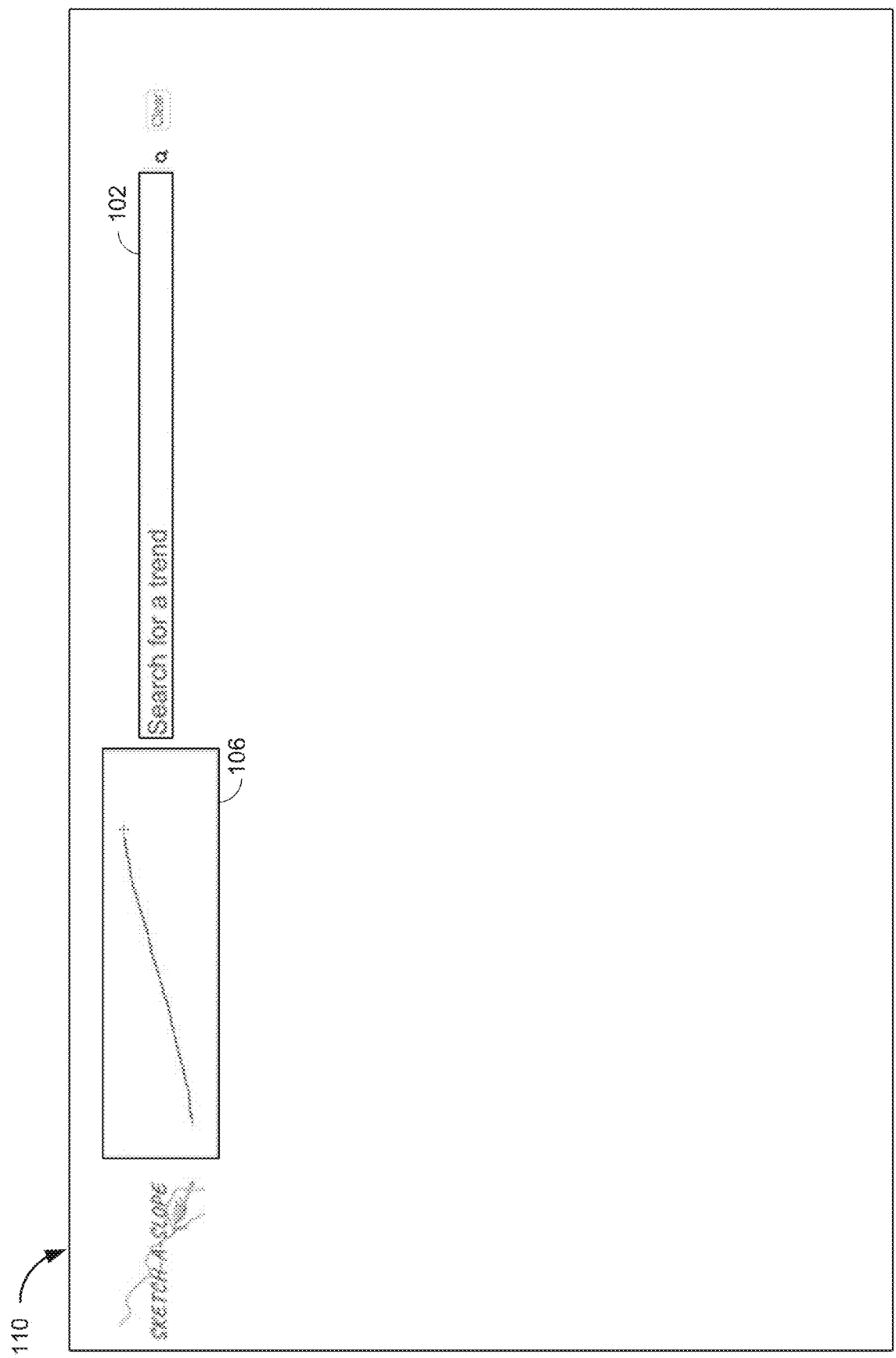
FIGS. 13A to 13C are screenshots illustrating the use of a system to search for a slow increase trend, in accordance with some embodiments.
Figure 13B:
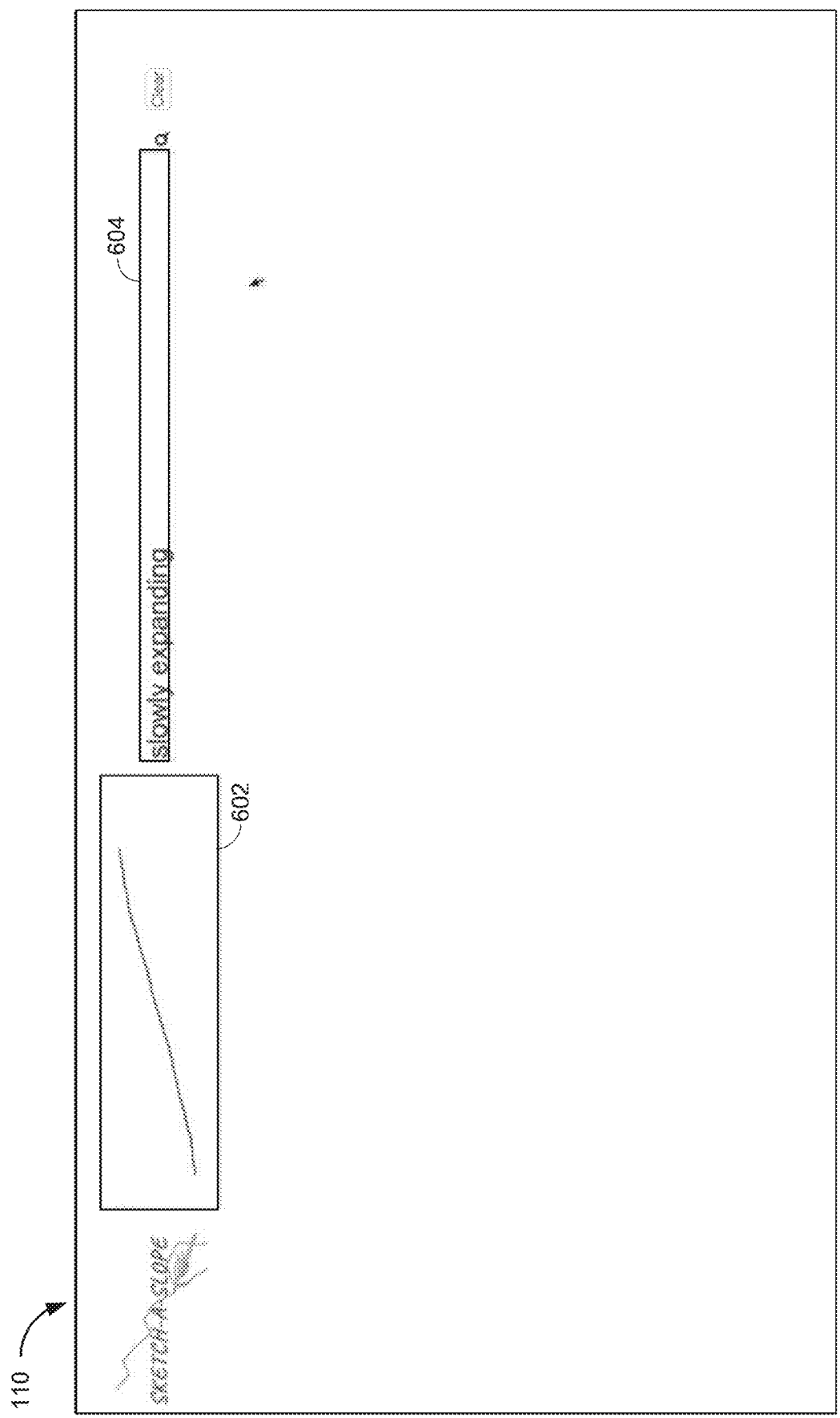
Figure 13C:
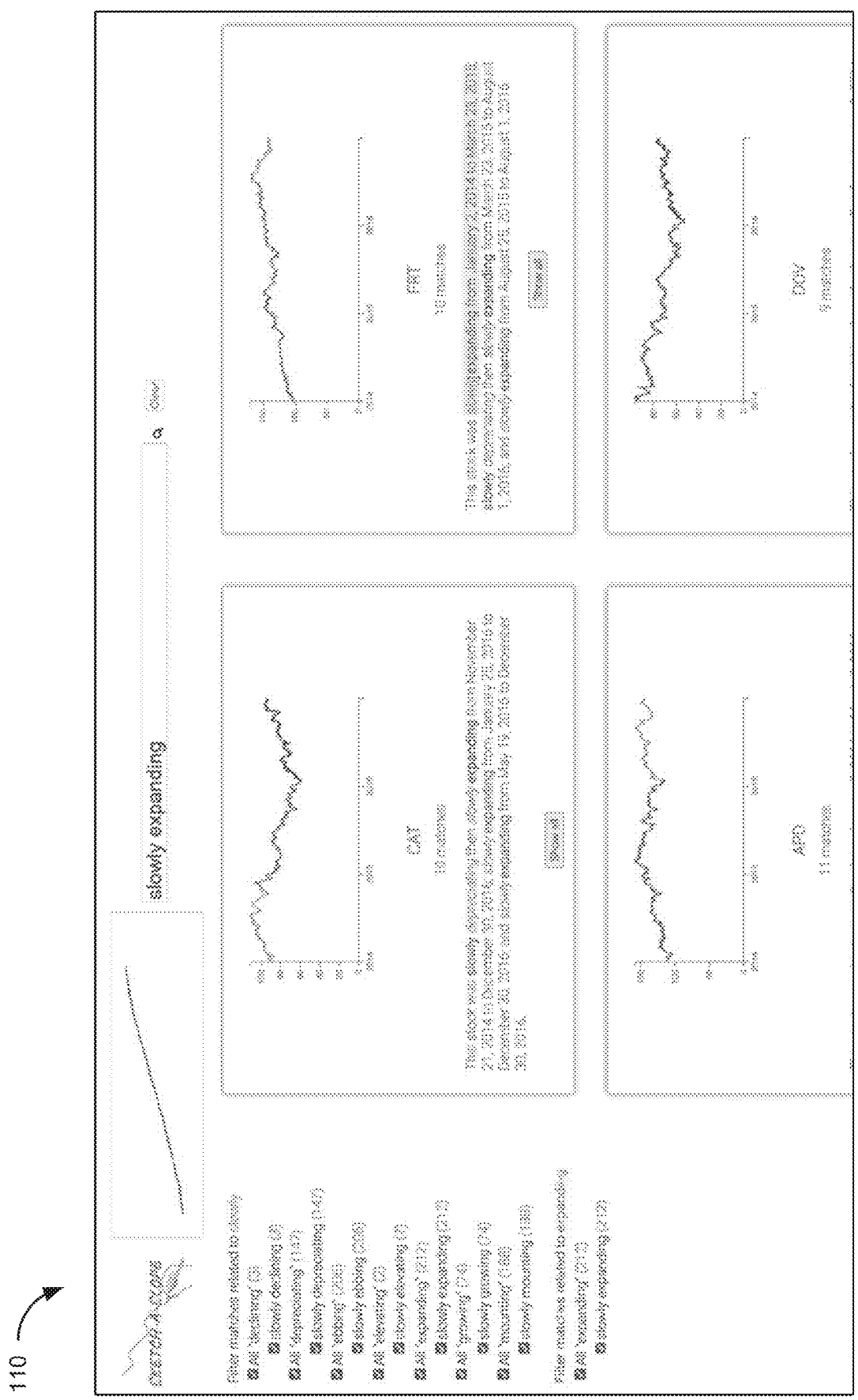

In some embodiments, the disclosed system and user interface can also search for trends such as a slowly increasing trend. This is illustrated in FIGS. 13A to 13C.

FIGS. 14A to 14D are screenshots illustrating the use of the disclosed system to search for complex trends, in accordance with some embodiments.

Figure 14A:
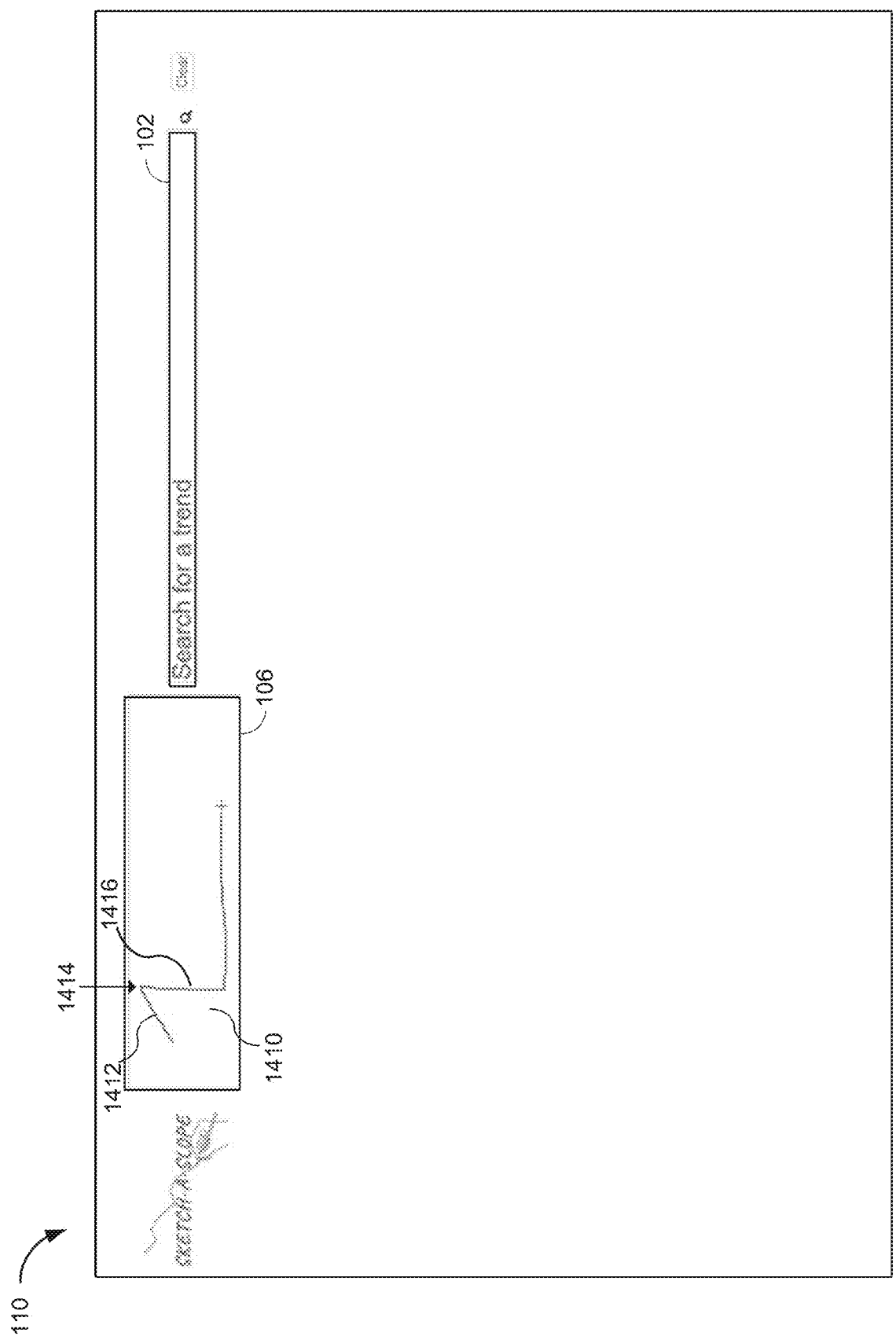
FIGS. 14A to 14D are screenshots illustrating the use of a system to search for complex trends, in accordance with some embodiments.
Figure 14B:
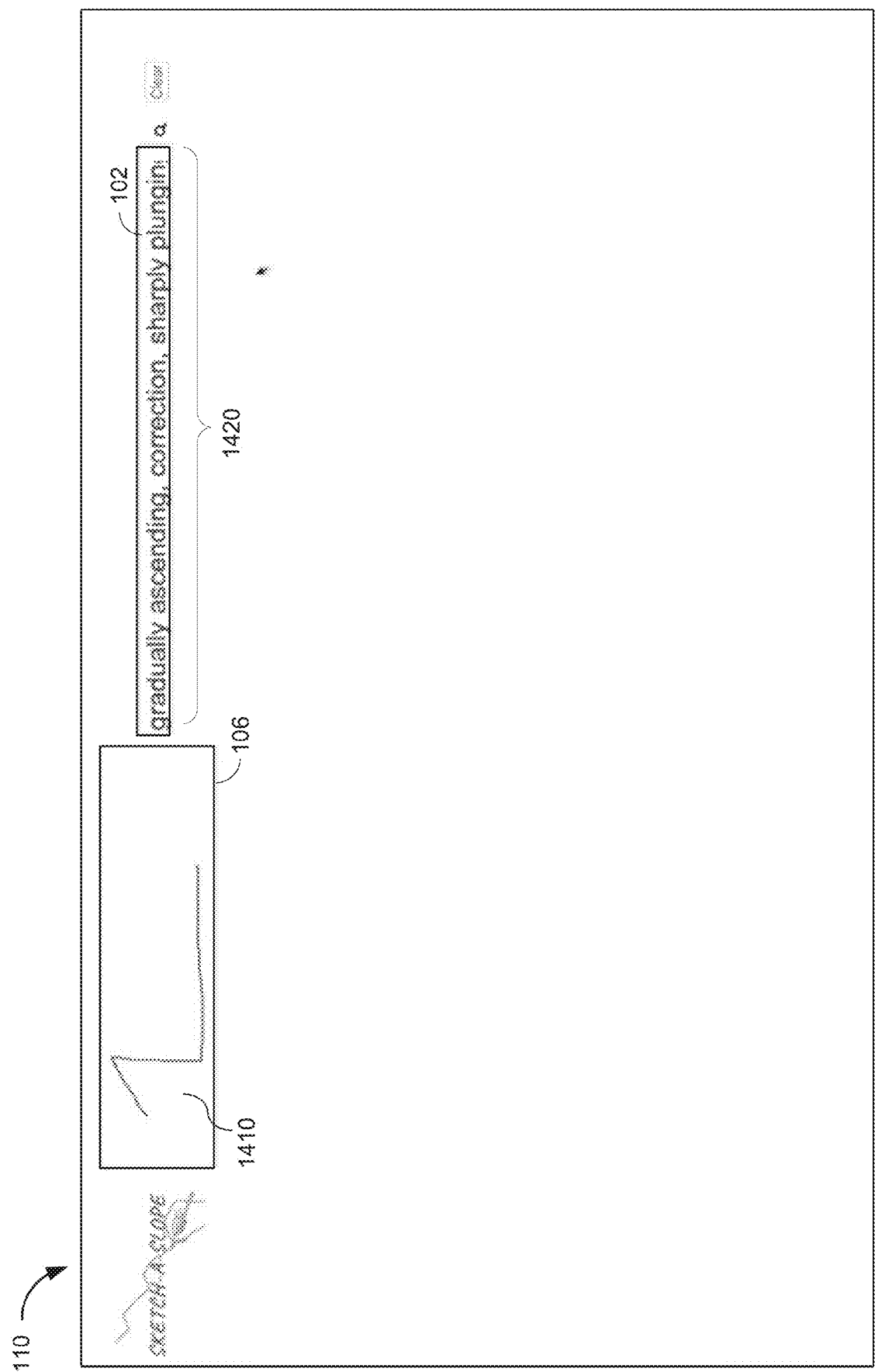
Figure 14C:
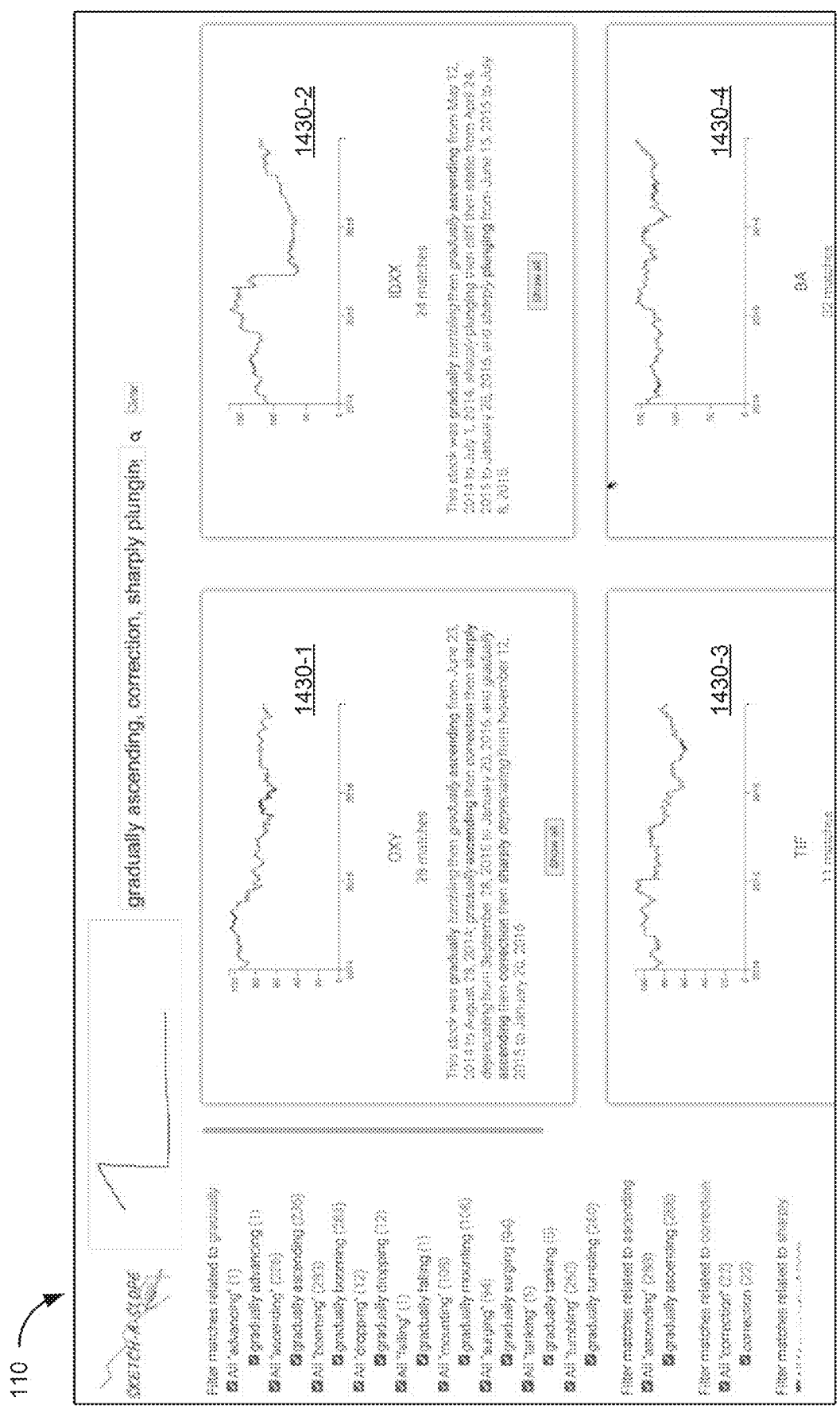
Figure 14D:
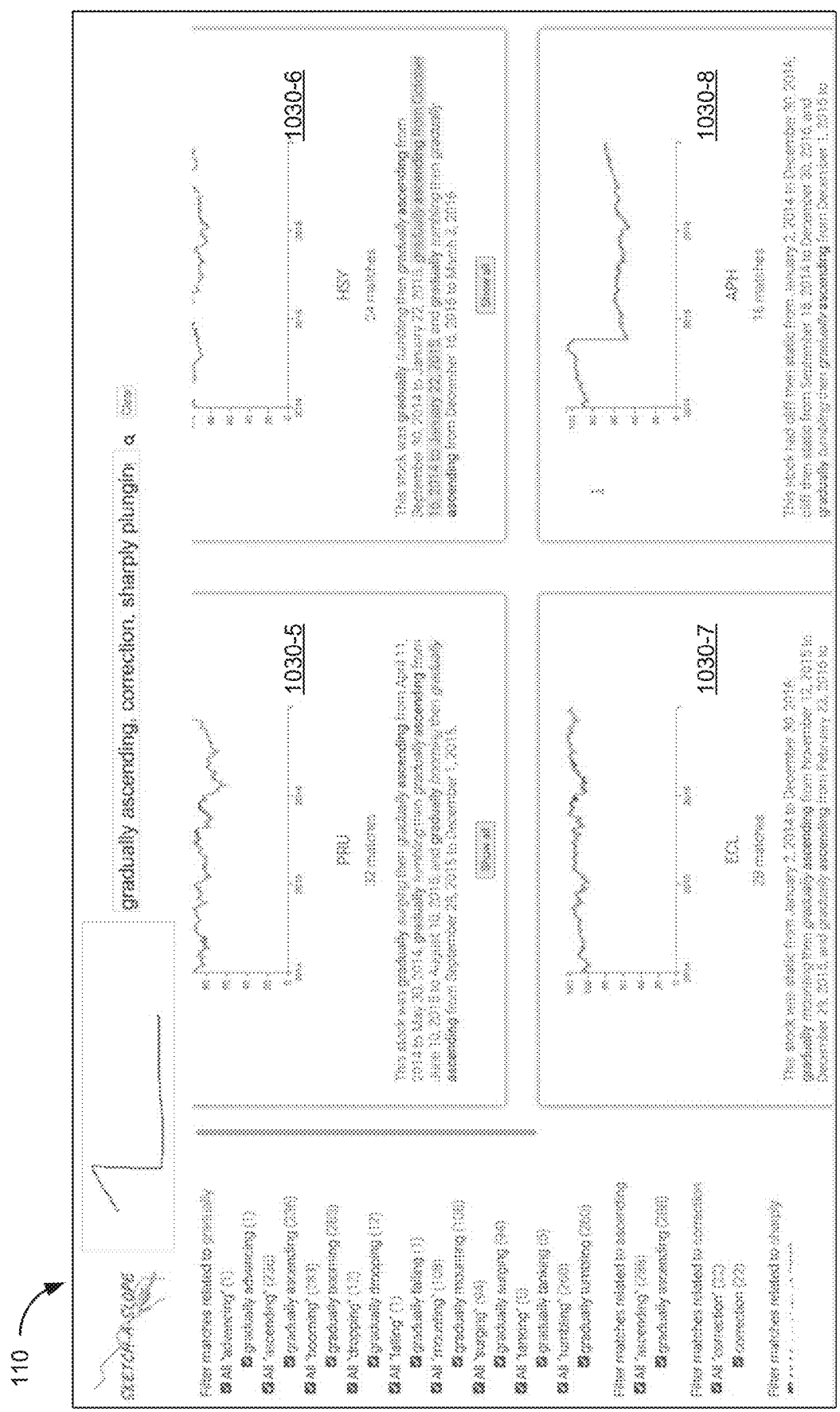

Sketching something like a peak followed by a steep fall can provide insights into volatile stocks, providing a detailed view of their performance. FIG. 14A illustrates a drawing input 1410 that includes a rising edge 1412, a peak 1414, and a sharp drop 1416. In FIG. 14B, the user interface 110 displays a set of search terms 1420 "gradually ascending, correction, sharply plunging." In FIGS. 14C and 14D, the user interface 110 displays stocks 1030 whose trends match the characteristics of the drawing input 1410 and the search terms 1420.

The above examples illustrate that the disclosed system not only understands the sketches, but also turns them into a text-based analytical query. The systems, methods and user interfaces disclosed herein enable users to "have conversations" with their data, where the users' sketches drive the narrative. Sketching can reveal data stories that are as dynamic and fluid as a user's thoughts, and can facilitate exploratory experiences with data beyond trends.

Figure 15C:
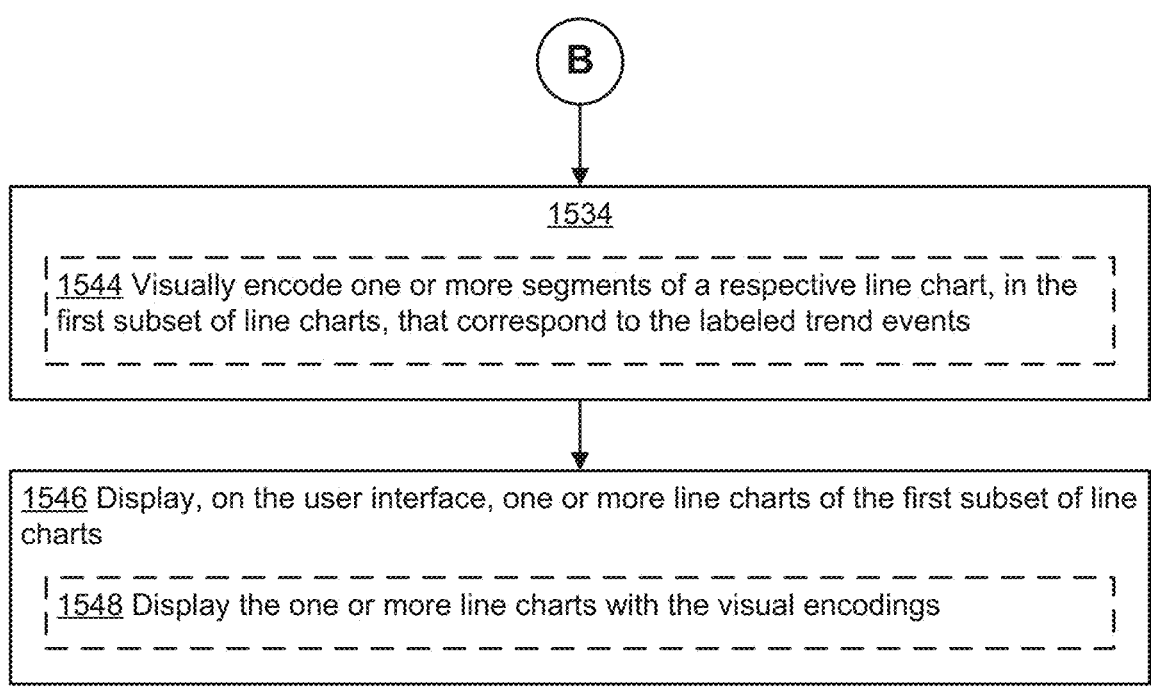

FIGS. 15A to 15C provide a flowchart of an example process for analyzing data trends, in accordance with some embodiments. The method 1500 is performed at a computing device (e.g., computing device 200) that includes a display (e.g., display 212), one or more processors 202, and memory 206. The memory stores one or more programs configured for execution by the one or more processors. In some embodiments, the operations shown in FIGS. 1A, 1B, 2A, 2B, 3, 4, 5, 6, 7, 8A, 8B, 9, 10A to 10C, 11A to 11C, 12A to 12C, 13A to 13C, and 14A to 14D correspond to instructions stored in the memory 206 or other non-transitory computer-readable storage medium. The computer-readable storage medium may include a magnetic or optical disk storage device, solid state storage devices such as Flash memory, or other non-volatile memory device or devices. In some embodiments, the instructions stored on the computer-readable storage medium include one or more of: source code, assembly language code, object code, or other instruction format that is interpreted by one or more processors. Some operations in the method 1500 may be combined and/or the order of some operations may be changed.

The computing device receives (1502), via a user interface (e.g., user interface 110), a drawing input directed to a dataset of time series data. This is illustrated in, for example, FIGS. 1A, 10A, 11A, 12A, 13A, and 14A.

In some embodiments, the drawing input comprises a sketch that is drawn (e.g., rendered) on the user interface using a user's finger, a mouse, or a stylus. In some embodiments, the computing device comprises an augmented reality/virtual reality (AR/VR) device or a headset device. The user interface can comprise a virtual user interface and the drawing input is a pinch and/or hold gesture received via the virtual user interface. In some embodiments, the user interface is also configured to receive natural language inputs (e.g., via a natural language input box 102). In some embodiments, the dataset includes data depicting trends. In some embodiments, the dataset includes continuous data.

In some embodiments, the display comprises (1504) a touch-sensitive display (e.g., touch-sensitive surface 214). Receiving the drawing input includes receiving a user-drawn input via the touch-sensitive display.

In some embodiments, receiving the drawing input includes receiving (1506) user upload of a sketch image onto the computing system.

In some embodiments, receiving the drawing input includes receiving (1508) user selection of a first sketch from a library of sketches (e.g., sketches and drawings 255).

In some embodiments, receiving the drawing input includes receiving (1510) user specification of a time span corresponding to the drawing input. For example, in some embodiments, a user can annotate the drawing input to specify a length of time (e.g., a number of days, months, or years), or starting and ending dates corresponding to the drawing input.

The computing device converts (1512) (e.g., via sketch interpreter 235 or sketch interpretation module 335) the drawing input into a set of search terms (e.g., one or more search terms, a set of text-based search tokens, where each token corresponds to a trend term or label).

In some embodiments, converting the drawing input into a set of search terms includes identifying (1514) a slope and shape of at least a segment of the drawing input.

In some embodiments, converting the drawing input into the set of search terms includes determining (1516) one or more line segments from (e.g., for) the drawing input, and assigning a respective search term (e.g., from a predetermined set of search tokens) to each of the line segments. In some embodiments, the computing device assigns a respective search term to one line segment. In some embodiments, the computing device assigns a respective search term to multiple segments (e.g., to describe trends such as "bouncy" and "volatile").

In some embodiments, the computing device, after determining the one or more line segments, determines (1518) angles and rotations over the one or more line segments; and compares the angles and rotations with distributions (e.g., kernel density estimation (KDE) distributions) of predetermined slope and shape labels. Each of the predetermined slope and shape labels corresponds to a respective (e.g., pre-assigned) search term. The computing device assigns the respective search term to each of the line segments according to the comparison.

In some embodiments, determining the one or more line segments from the drawing input includes determining (1520), for each of the line segments, a respective set of values for a set of (e.g., one or more) attributes (e.g., characteristics, geometric features) of the respective line segment. For example, the attributes can include a gradient of the line, a slope direction of the line, a curvature and/or an angle. The values can be a slope value (or gradient value), a value for slope direction (e.g., upward direction, downward direction, horizontal direction), a curvature value, and an angle (e.g., relative to the horizontal axis))

In some embodiments, the computing device applies (1522) an algorithm (e.g., Douglas-Peucker algorithm) to linearize the drawing input into one or more line segments. This is also illustrated in FIG. 4.

In some embodiments, applying the algorithm includes modifying (1524) a value of a parameter (e.g., an epsilon value or a value for an error parameter) of the algorithm according to a user of the drawing input. For example, in some embodiments, the computing device linearizes the drawing input into one or more line segments using an algorithm such as the Douglas-Peucker algorithm with an empirically derived epsilon value (e.g., a preset value such as 30). The epsilon value is an error parameter that controls how closely the line segments adhere to the original data. In some embodiments, an epsilon value (such as a value of 30) consistently maintained hand-drawn detail without generating noise or becoming distracted by hand-drawn line imperfections. In some embodiments, the computing device can interpret a drawing shape and/or slope input by a user according to prior information about user preferences and characteristics (e.g., drawing style), and modify the epsilon parameter to adapt the labeling algorithm to the sketching style of the user. For example, if the computing device has prior knowledge that a user tends to overestimate or exaggerate the slope of a line, the computing device can apply a correction factor to the epsilon parameter to account for the user's drawing style.

Referring to FIG. 15B, in some embodiments, the computing device, after translating the drawing input into the set of search terms, automatically populates (1526) (e.g., displays) the set of search terms in an input box (e.g., natural language input box 102) of the user interface. Each of the search terms corresponds to respective descriptive text that describes a respective trend of a portion of the drawing input. For example, FIGS. 14A and 14B illustrate that in response to receiving the drawing input 1410 that includes a rising edge portion 1412, a peak 1414, and a sharp drop 1416, the user interface 110 displays a set of search terms 1420 "gradually ascending," "correction," and "sharply plunging." The search term "gradually ascending" corresponds to the rising edge portion 1412 whereas the search terms "correction" and "sharply plunging" refer to the portion 1416 of the drawing input 1410.

In some embodiments, after converting the drawing input into a set of search terms, the computing device inputs (1528) the set of search terms into a real-time data stream. For example, a user can sketch trends or patterns they anticipate or wish to track, and the system can dynamically adjust to monitor and alert users on these trends.

The computing device executes (1530) a query against a search index (e.g., search index 170) for the dataset using the set of search terms to retrieve (e.g., from the search index) a plurality of labeled trend events (e.g., labeled trend events 252). Each of the labeled trend events (i) corresponds to respective portion (e.g., less than all) of a respective line chart of a set of line charts (e.g., line graphs, line plots)

representing the time series data and (ii) has a respective chart identifier. In some embodiments, each labeled trend event comprises metadata, including chart ID, time points, and semantic labels that are indexed to facilitate efficient search and retrieval.

In some embodiments, executing the query against the search index for the dataset using the set of search terms to retrieve the plurality of labeled trend events includes identifying (1532) data in the dataset corresponding to the slope and shape of at least a segment of the drawing input.

The computing device generates (1534) a first subset of line charts according to the retrieved plurality of labeled trend events.

In some embodiments, the computing device generates the first subset of line charts according to the retrieved plurality of labeled trend events by assigning (1536) each of the labeled trend events to a respective group, of one or more groups, according to the chart identifier of the labeled trend event. Each group corresponds to one respective line chart in the set of line charts.

In some embodiments, the computing device ranks (1538) the one or more groups by aggregating, for each group, respective composite scores of the respective labeled trend events corresponding to the group.

In some embodiments, the computing device retrieves (1540), from the dataset, data corresponding to a first subset of (e.g., one or more) line charts in accordance with a ranking of the one or more groups.

In some embodiments, after retrieving the plurality of labeled trend events, the computing device determines (1542), for a respective labeled trend event (e.g., or each of the labeled trend events), a respective composite score according to a ranking algorithm and a respective visual saliency score. For example, the ranking algorithm concerns how precisely the search term matches the event labels of the labeled trend events. In some embodiments, the ranking algorithm takes into account factors such as term frequency, inverse document frequency, and the length of the field being searched. In some embodiments, the ranking algorithm is the BM25 algorithm. The visual saliency score quantifies the perceptual prominence of a trend, and is designed such that the search scenario favors the most visually salient events, as discussed with respect to FIG. 9 and section on "Visual Saliency Scoring." In some embodiments, the respective composite score is a product (e.g., a multiplication) of a respective label score (determined according to the ranking algorithm) and the respective visual saliency score.

Referring to FIG. 15C, in some embodiments, the computing device visually encodes (1544) (e.g., annotates, color-encodes, or labels) one or more segments of a respective line chart, in the first subset of line charts, that correspond to the labeled trend events. For example, in FIG. 1A, the computing device encodes segment 128-1 of the chart 122-1 in green, encodes segment 128-2 in purple, and encodes segment 128-3 in red.

The computing device displays (1546), on the user interface, one or more line charts of the first subset of line charts.

In some embodiments, the computing device displays (1548) the one or more line charts with the visual encodings. For example, the computing device can visually emphasize the one or more segments of a respective line chart, corresponding to the labeled trend events, (e.g., with a different color, or line thickness, or other visual emphasis) compared to other portions of the line chart.

Although FIGS. 15A to 15C illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments:

(A1) In accordance with some embodiments, a method for analyzing data trends is performed at a computing device that includes a display, one or more processors, and memory. The method includes (i) receiving, via a user interface, a drawing input directed to a dataset of time series data; (ii) converting the drawing input into a set of search terms; (iii) executing a query against a search index for the dataset using the set of search terms to retrieve a plurality of labeled trend events, each of the labeled trend events (a) corresponding to respective portion of a respective line chart of a set of line charts representing the time series data and (b) having a respective chart identifier; (iv) generating a first subset of line charts according to the retrieved plurality of labeled trend events; and (v) displaying, on the user interface, one or more line charts of the first subset of line charts.

(A2) In some embodiments of A1, converting the drawing input into a set of search terms includes identifying a slope and shape of at least a segment of the drawing input; and executing the query against the search index for the dataset using the set of search terms to retrieve the plurality of labeled trend events includes identifying data in the dataset corresponding to the slope and shape.

(A3) In some embodiments of A1 or A2, converting the drawing input into the set of search terms includes: (i) determining one or more line segments from the drawing input; and (ii) assigning a respective search term to each of the line segments.

(A4) In some embodiments of A3, assigning the respective search term to each of the line segments includes: (i) after determining the one or more line segments, determining angles and rotations over the one or more line segments; (ii) comparing the angles and rotations with distributions of predetermined slope and shape labels, each of the predetermined slope and shape labels corresponding to a respective search term; and (iii) assigning the respective search term to each of the line segments according to the comparison.

(A5) In some embodiments of A3 or A4, determining the one or more line segments from the drawing input includes determining, for each of the line segments, a respective set of values for a set of attributes of the respective line segment.

(A6) In some embodiments of any of A3-A5, determining the one or more line segments from the drawing input includes applying an algorithm to linearize the drawing input into one or more line segments.

(A7) In some embodiments of A6, applying the algorithm includes modifying a value of a parameter of the algorithm according to a user of the drawing input.

(A8) In some embodiments of any of A1-A7, the method includes after converting the drawing input into the set of search terms, automatically populating the set of search terms in an input box of the user interface, each of the search terms corresponding to respective descriptive text that describes a respective trend of a portion of the drawing input.

(A9) In some embodiments of any of A1-A8, the display comprises a touch-sensitive display. Receiving the drawing input includes receiving a user-drawn input via the touch-sensitive display.

(A10) In some embodiments of any of A1-A9, receiving the drawing input includes receiving user upload of a sketch image onto the computing device.

(A11) In some embodiments of any of A1-A10, receiving the user input includes receiving user selection of a first sketch from a library of sketches.

(A12) In some embodiments of any of A1-A11, generating the first subset of line charts according to the retrieved plurality of labeled trend events includes: (i) assigning each of the labeled trend events to a respective group, of one or more groups, according to the chart identifier of the labeled trend event, each group corresponding to one respective line chart in the set of line charts; and (ii) retrieving, from the dataset, data corresponding to a first subset of line charts in accordance with a ranking of the one or more groups.

(A13) In some embodiments of any of A10-A12, the method includes prior to retrieving the data corresponding to the first subset of line charts: ranking the one or more groups by aggregating, for each group, respective composite scores of the respective labeled trend events corresponding to the group.

(A14) In some embodiments of any of A1-A13, generating the first subset of line charts includes visually encoding one or more segments of a respective line chart, in the first subset of line charts, that correspond to the labeled trend events; and displaying the one or more line charts of the first subset of line charts includes displaying the one or more line charts with the visual encodings.

(A15) In some embodiments of any of A1-A14, the method includes after retrieving the plurality of labeled trend events: determining, for a respective labeled trend event, a respective composite score according to a ranking algorithm and a respective visual saliency score.

(A16) In some embodiments of any of A1-A15, receiving the drawing input directed to the dataset of time series data includes receiving user specification of a time span corresponding to the drawing input.

(A17) In some embodiments of any of A1-A16, the method further comprises: after converting the drawing input into the set of search terms, inputting the set of search terms into a real-time data stream.

(B1) In accordance with some embodiments, a computing device includes a display, one or more processors, and memory coupled to the one or more processors, the memory storing instructions that, when executed by the one or more processors, cause the computing device to perform the method of any of A1-A19.

(C1) In accordance with some embodiments, a computer-readable storage medium stores one or more programs that, when executed by one or more processors of a computing device, cause the computing device to perform the method of any of A1-A19.

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

As used herein, the term "exemplary" means "serving as an example, instance, or illustration," and does not necessarily indicate any preference or superiority of the example over any other configurations or embodiments.

As used herein, the term "and/or" encompasses any combination of listed elements. For example, "A, B, and/or C" entails each of the following possibilities: A only, B only, C only, A and B without C, A and C without B, B and C without A, and a combination of A, B, and C.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for analyzing data trends, performed at a computing device that includes a display, one or more processors, and memory, the method comprising:
   receiving, via a user interface, a drawing input directed to a dataset of time series data;
   converting the drawing input into a set of search terms, including:
     determining one or more line segments from the drawing input;

determining angles and rotations over the one or more line segments;

comparing the angles and rotations with distributions of predetermined slope and shape labels, each of the predetermined slope and shape labels corresponding to a search term of the set of search terms; and assigning a respective search term, of the set of search terms, to each of the line segments based on the comparing;

executing a query against a search index for the dataset using the set of search terms to retrieve a plurality of labeled trend events, each of the labeled trend events (i) corresponding to a respective portion of a respective line chart of a set of line charts representing the time series data and (ii) having a respective chart identifier;

generating a first subset of line charts according to the retrieved plurality of labeled trend events; and displaying, on the user interface, one or more line charts of the first subset of line charts.

2. The method of claim 1, wherein:
converting the drawing input into a set of search terms includes identifying a slope and shape of at least a segment of the drawing input; and
executing the query against the search index for the dataset using the set of search terms to retrieve the plurality of labeled trend events includes identifying data in the dataset corresponding to the slope and shape.

3. The method of claim 1, wherein determining the one or more line segments from the drawing input includes:
determining, for each of the line segments, a respective set of values for a set of attributes of the respective line segment.

4. The method of claim 1, wherein determining the one or more line segments from the drawing input includes applying an algorithm to linearize the drawing input into one or more line segments.

5. The method of claim 4, wherein applying the algorithm includes modifying a value of a parameter of the algorithm according to a user of the drawing input.

6. The method of claim 1, further comprising:
after converting the drawing input into the set of search terms, automatically populating the set of search terms in an input box of the user interface, each of the search terms corresponding to respective descriptive text that describes a respective trend of a portion of the drawing input.

7. The method of claim 1, wherein:
the display comprises a touch-sensitive display; and
receiving the drawing input includes receiving a user-drawn input via the touch-sensitive display.

8. The method of claim 1, wherein receiving the drawing input includes receiving user upload of a sketch image onto the computing device.

9. The method of claim 1, wherein receiving the drawing input includes receiving user selection of a first sketch from a library of sketches.

10. The method of claim 1, wherein generating the first subset of line charts according to the retrieved plurality of labeled trend events includes:
assigning each of the labeled trend events to a respective group, of one or more groups, according to the chart identifier of the labeled trend event, each group corresponding to one respective line chart in the set of line charts; and retrieving, from the dataset, data corresponding to a first subset of line charts in accordance with a ranking of the one or more groups.

11. The method of claim 10, further comprising:
prior to retrieving the data corresponding to the first subset of line charts:
ranking the one or more groups by aggregating, for each group, respective composite scores of the respective labeled trend events corresponding to the group.

12. The method of claim 1, wherein:
generating the first subset of line charts includes visually encoding one or more segments of a respective line chart, in the first subset of line charts, that correspond to the labeled trend events; and
displaying the one or more line charts of the first subset of line charts includes displaying the one or more line charts with one or more visual encodings.

13. The method of claim 1, further comprising:
after retrieving the plurality of labeled trend events:
determining, for a respective labeled trend event, a respective composite score according to a ranking algorithm and a respective visual saliency score.

14. The method of claim 1, wherein receiving the drawing input directed to the dataset of time series data includes:
receiving user specification of a time span corresponding to the drawing input.

15. The method of claim 1, further comprising:
after converting the drawing input into the set of search terms, inputting the set of search terms into a real-time data stream.

16. A computing device, comprising:
a display;
one or more processors; and
memory coupled to the one or more processors, the memory storing one or more programs configured for execution by the one or more processors, the one or more programs including instructions for:
receiving, via a user interface, a drawing input directed to a dataset of time series data;
converting the drawing input into a set of search terms, including:
determining one or more line segments from the drawing input;
determining angles and rotations over the one or more line segments;
comparing the angles and rotations with distributions of predetermined slope and shape labels, each of the predetermined slope and shape labels corresponding to a search term of the set of search terms; and
assigning a respective search term, of the set of search terms, to each of the line segments based on the comparing;
executing a query against a search index for the dataset using the set of search terms to retrieve a plurality of labeled trend events, each of the labeled trend events (i) corresponding to respective portion of a respective line chart of a set of line charts representing the time series data and (ii) having a respective chart identifier;
generating a first subset of line charts according to the retrieved plurality of labeled trend events; and
displaying, on the user interface, one or more line charts of the first subset of line charts.

17. The computing device of claim 16, wherein:
the instructions for converting the drawing input into a set of search terms include instructions for identifying a slope and shape of at least a segment of the drawing input; and
the instructions for executing the query against the search index for the dataset using the set of search terms to retrieve the plurality of labeled trend events include instructions for identifying data in the dataset corresponding to the slope and shape.

18. A non-transitory computer-readable storage medium storing one or more programs configured for execution by one or more processors of a computing device, the one or more programs comprising instructions for:
receiving, via a user interface, a drawing input directed to a dataset of time series data;
converting the drawing input into a set of search terms, including:
determining one or more line segments from the drawing input;
determining angles and rotations over the one or more line segments;
comparing the angles and rotations with distributions of predetermined slope and shape labels, each of the predetermined slope and shape labels corresponding to a search term of the set of search terms; and
assigning a respective search term, of the set of search terms, to each of the line segments based on the comparing;
executing a query against a search index for the dataset using the set of search terms to retrieve a plurality of labeled trend events, each of the labeled trend events (i) corresponding to respective portion of a respective line chart of a set of line charts representing the time series data and (ii) having a respective chart identifier;
generating a first subset of line charts according to the retrieved plurality of labeled trend events; and
displaying, on the user interface, one or more line charts of the first subset of line charts.

19. The method of claim 4, wherein:
the drawing input is received from a user; and
applying the algorithm includes determining a value of a parameter of the algorithm according to a preference of the user.

20. The method of claim 4, wherein:
the drawing input is received from a user; and
applying the algorithm includes determining a value of a parameter of the algorithm according to a drawing style of the user.

* * * * *